United States Patent [19]
Minagawa

[11] Patent Number: 6,023,774
[45] Date of Patent: Feb. 8, 2000

[54] COMPUTER SYSTEM HAVING FACILITY FOR DETECTION OF DATA ABNORMALITIES

[75] Inventor: Akitaka Minagawa, Kawasaki, Japan

[73] Assignee: Fujitsu Limited, Kawasaki, Japan

[21] Appl. No.: 08/691,443

[22] Filed: Aug. 2, 1996

Related U.S. Application Data

[63] Continuation of application No. 08/305,889, Sep. 14, 1994, abandoned.

[30] Foreign Application Priority Data

Oct. 12, 1993 [JP] Japan .................................... 5-254294
Jul. 29, 1994 [JP] Japan .................................... 6-178465

[51] Int. Cl.⁷ ................................................ G06F 11/00
[52] U.S. Cl. ........................... 714/43; 714/716; 714/821; 370/242; 370/249
[58] Field of Search ........................... 395/183.19, 183.2; 371/20.5, 67.1, 68.1, 68.2, 71, 20.1; 370/249, 242; 714/43, 44, 716, 717, 819, 820, 821

[56] References Cited

U.S. PATENT DOCUMENTS

| | | | |
|---|---|---|---|
| 3,581,075 | 5/1971 | Taby | 371/71 X |
| 3,889,109 | 6/1975 | Blessin | 371/20.5 X |
| 4,376,998 | 3/1983 | Abbott | 371/71 X |
| 4,631,719 | 12/1986 | Huffman | 371/71 X |
| 4,750,181 | 6/1988 | McDonald | 371/71 |
| 4,980,887 | 12/1990 | Dively | 371/20.5 X |
| 5,128,962 | 7/1992 | Kerslake | 371/20.5 X |
| 5,161,612 | 11/1992 | Watkins | 395/183.19 |
| 5,278,977 | 1/1994 | Spencer | 395/575 |
| 5,367,395 | 11/1994 | Yajima | 371/20.5 X |
| 5,471,484 | 11/1995 | Kawasaki | 371/67.1 X |

FOREIGN PATENT DOCUMENTS

| | | |
|---|---|---|
| 55-85156 | 6/1980 | Japan . |
| 57-25026 | 2/1982 | Japan . |
| 1-33652 | 2/1989 | Japan . |
| 2-129730 | 5/1990 | Japan . |
| 3-63857 | 3/1991 | Japan . |

*Primary Examiner*—Dieu-Minh T. Le
*Attorney, Agent, or Firm*—Staas & Halsey

[57] ABSTRACT

A computer system which includes data transmission line and a plurality of data transmissions apparatuses connected in parallel to the data transmission line. Each data transmission apparatus generates transmission data and provides the generated transmission data to the data transmission line. In each data transmission apparatus, the generated transmission data provided to the data transmission line is wrapped around back to the respective data transmission apparatus without passing through any other data transmission apparatus. Each data transmission apparatus includes a data abnormality monitoring unit which determines whether the generated transmission data correlates with the transmission data which was wrapped around. It is determined that an abnormality occurred when the data abnormality monitoring unit determines that the generated transmission data does not correlate with the transmission data which was wrapped around.

40 Claims, 39 Drawing Sheets

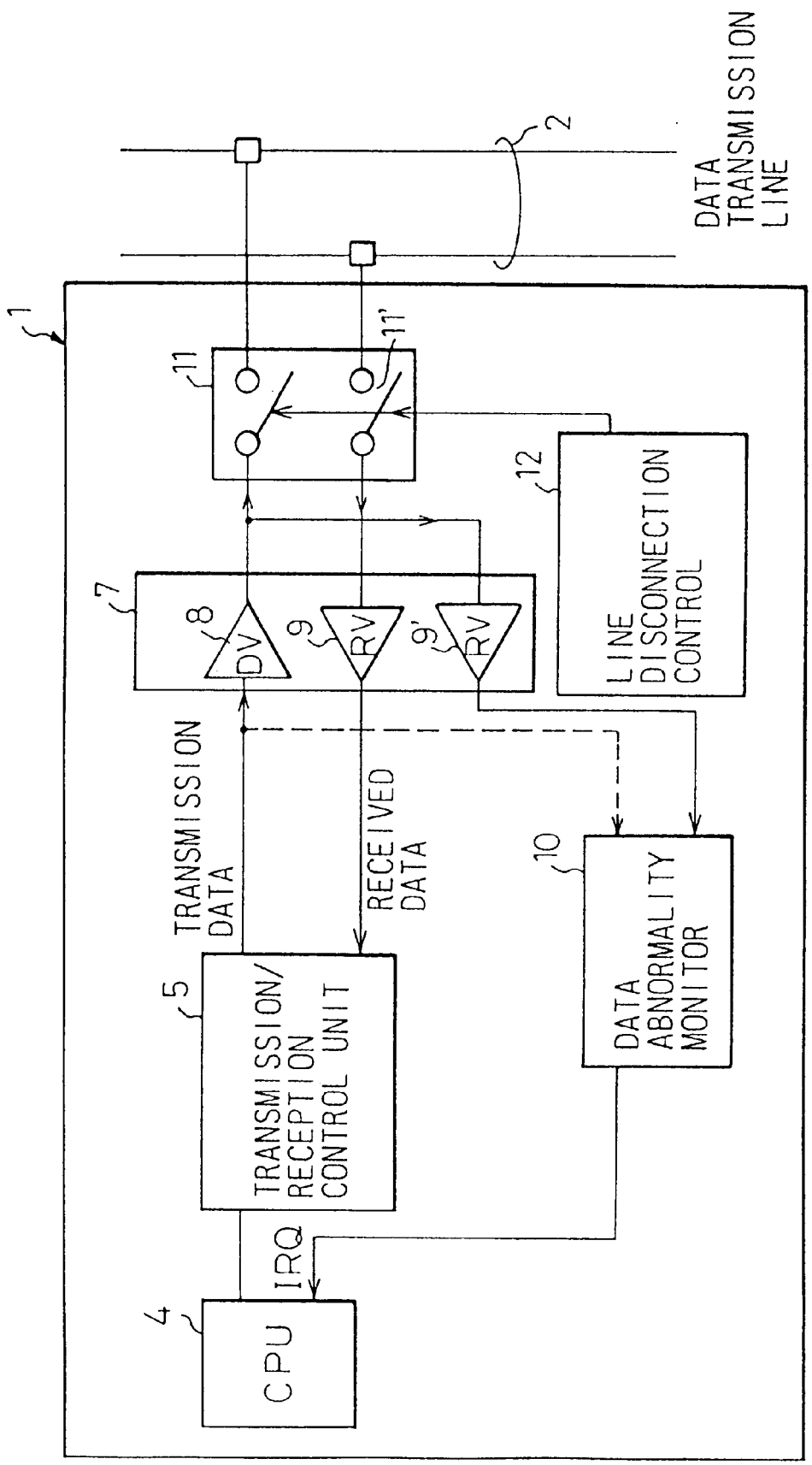

COMPUTER SYSTEM HAVING FACILITY FOR DETECTION OF DATA ABNORMALITIES

This application is a continuation, of application Ser. No. 08/305,889, filed Sep. 14, 1994, now abandoned.

BACKGROUND OF THE INVENTION

1. Field of the Invention

The present invention relates to a computer system having a facility for detection of data abnormalities, more particularly, to a system of detection of abnormalities in data transmission in a data transmission apparatus which transmits data using a data transmission line, and such a data transmission apparatus.

In recent years, the increasing number of computer systems brought on-line has in many cases resulted in a number of computer apparatuses in the system being connected in common through the same data transmission line in a so-called multidrop form.

2. Description of the Related Art

In general, a large number of data transmission apparatuses are connected to a data transmission line. Therefore, an abnormality occurring on the data transmission line causes abnormalities in all the data transmission apparatuses connected to the line. The effect on the computer system as a whole is consequently great.

Among the abnormalities of a data transmission line is the physical disconnection etc. of the signal line. In general, however, the abnormality is caused by a fault occurring in one of the number of data transmission apparatuses connected in common to the data transmission line.

In such a case, a fault occurring at a single data transmission apparatus ends up causing the transmission of data by all the other normal data transmission apparatuses connected in common to the same data transmission line to stop. That is, the other data transmission apparatuses, despite being normal in function, also are made to be abnormal in data transmission operation. In such a case, it is necessary to disconnect the faulty data transmission apparatus from the data transmission line to restore the system from the abnormality.

In this case, however, since all the data transmission apparatuses are connected in common to a single data transmission line, in outward appearance it seems that all the data transmission apparatuses in the system including the faulty data transmission apparatus suffer from abnormalities. Accordingly, it is extremely difficult to specifically determine the faulty data transmission apparatus in the system. As a result, time is taken for the restoration of the system from the abnormal state and therefore the loss in the computer system becomes extremely serious.

The inventor of this application consequently prepared a prototype of a data transmission apparatus to deal with this, described in detail later using the drawings. This data transmission apparatus introduced a transmission/reception control unit for detection of abnormalities and introduced a driver (DV) and receiver (RV) constituting a signal conversion element so as to detect abnormalities in the data transmission. This abnormality detection transmission/reception control unit performed substantially the same function as a transmission/reception control unit for normal data transmission and reception, so the abnormality detection transmission/reception control unit could be realized using exactly the same LSI as the LSI constituting a normal transmission/reception control unit. This LSI, however, included a set of the transmission side circuits and reception side circuits and was considerably expensive. In addition, in the LSI constituting the abnormality detection transmission/reception control unit, use was made of only the reception side circuits, i.e., the transmission side circuits were left unused, so the cost performance was poor. Accordingly, among the pair of the driver (DV) and receiver (RV) provided with the abnormality detection transmission/reception control unit, the driver was left unused and wasted. In the end, there was the problem that the cost of the data transmission apparatus increased and was no longer practical.

Also, when transmitting data from a central processing unit (CPU), the central processing unit both processes the data transmission and receives wrapped data obtained by wrapping the data it has itself transmitted. It is further necessary to check for coincidence of the transmission data and the wrapped data. Therefore, a complicated control program becomes required for the control of the transmission, reception, coincidence checking, and other operations. In addition, the central processing unit has to be given a large processing capability. Therefore, the load on the central processing unit increases and the cost of the central processing unit rises. In this respect as well, it is difficult to realize an inexpensive data transmission apparatus.

Further, when detecting abnormalities in data transmission, human intervention was required to disconnect the abnormal data transmission apparatus from the data transmission line. Accordingly, considerable time was taken for restoration of the overall computer system.

SUMMARY OF THE INVENTION

Accordingly, the present invention has as its object to enable the prompt detection of a fault occurring in data transmission apparatuses connected in common to a data transmission line without increasing the cost of the equipment and without increasing the load on the central processing unit and, further, to enable the faulty data transmission apparatus to be automatically disconnected from the data transmission line and for the computer system to be promptly restored.

To attain the above object, the present invention provides a computer system in which each data transmission apparatus is provided with a data abnormality monitoring means, the transmission data output from each data transmission apparatus to the data transmission line is wrapped in the data transmission apparatus to produce wrapped data, the wrapped data is input to the data abnormality monitoring means, the presence of correlation with the transmission data is monitored, and, when there is no correlation, it is determined that an abnormality has occurred in the data transmission.

BRIEF DESCRIPTION OF THE DRAWINGS

The above object and features of the present invention will be more apparent from the following description of the preferred embodiments with reference to the accompanying drawings, wherein:

FIG. 43 is a view of a the configuration for realization of the configuration of FIG. 5 using a data transmission line under a full duplex communication system.

DESCRIPTION OF THE PREFERRED EMBODIMENTS

Before describing the embodiments of the present invention, the related art and the disadvantages therein will be described with reference to the related figures.

Figure 1:
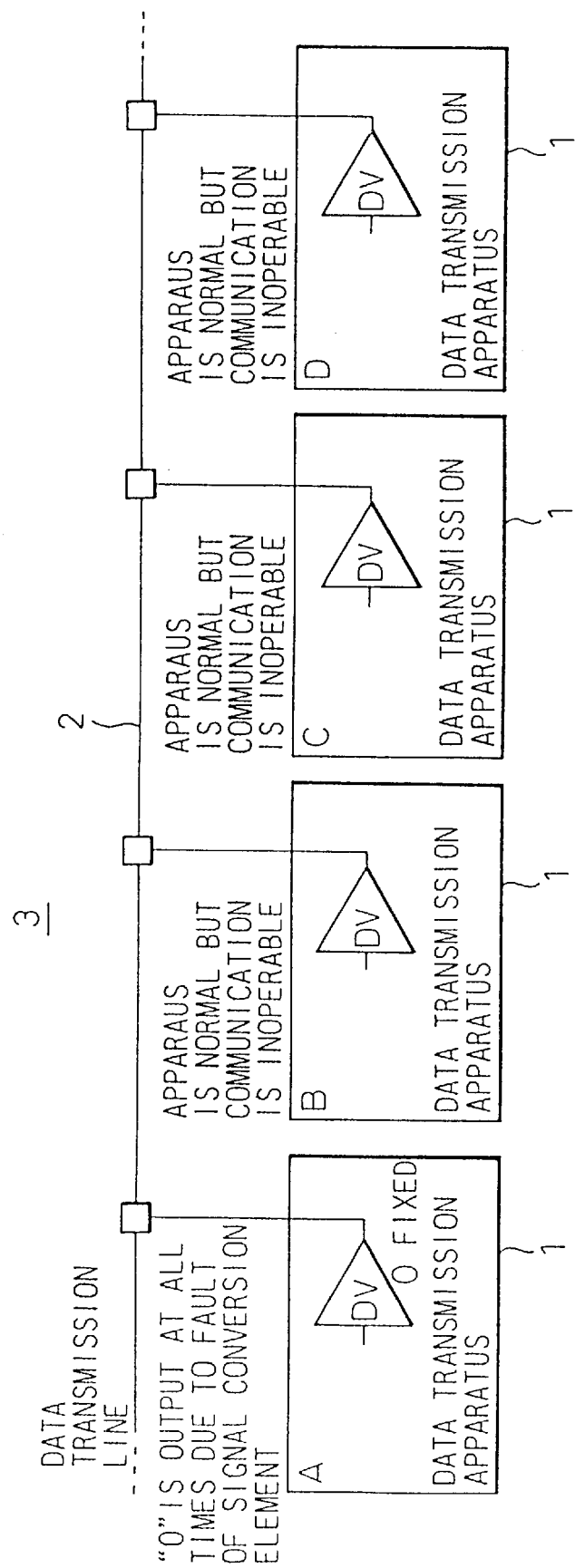
FIG. 1 is a view of an example of a configuration in which a plurality of data transmission apparatuses are connected to a common data transmission line.

FIG. 1 is a view of an example of a configuration in which a plurality of data transmission apparatuses are connected to a common data transmission line. As shown in FIG. 1, in a computer system 3 in which a large number of data transmission apparatuses 1 are connected to the same data transmission line 2, when a fault occurs in one data transmission apparatus 1 (A), the data transmission operations at all of the other normal data transmission apparatuses 1 connected to the data transmission line 2 ends up being stopped.

Each data transmission apparatus 1, as mentioned later, is provided with a signal conversion element (generally referred to as a driver (DV)/receiver (RV)) for converting, for example, level converting, the signals handled at the central processing unit or transmission/reception control unit (mainly performing parallel/serial conversion of data output from the central processing unit and serial/parallel conversion of data input to the central processing unit) in the data transmission apparatus 1 into signals suitable for transmission on the data transmission line 2.

Assume that the following type of fault occurs in the transmission/reception control unit. That is, the driver (DV) at the coupling point between the data transmission line 2 and the data transmission apparatus 1 (A) ends up converting the signals even though the signal conversion is not actually required and, for example, the logic "0" is continuously output (or the logic "1" is continuously output). In this case, when the other data transmission apparatuses 1(B), 1(C), and 1(D) connected in common to the data transmission line 2 are transmitting data, the signals which these data transmission apparatuses 1(B) to 1(D) output to the data transmission line 2 (logic "1" and "0" signals) collide with the signals which the faulty data transmission apparatus 1(A) outputs (for example, logic "0") and therefore the data transmission apparatuses 1(B) to 1(D) can no longer normally transmit data even though they themselves are normal.

Due to this situation, a fault occurring in one data transmission apparatus 1(A) has an effect on all the other normal data transmission apparatuses 1(B) to 1(D) connected in common to the data transmission line 2 and the operation of transmitting data through the data transmission line 2 stops.

In this way, even if a fault occurs at the signal conversion element serving as the coupling point between the data transmission line 2 and the data transmission apparatus 1 in the computer system, that signal conversion element converts signals independently from the central processing unit, so the central processing unit does not monitor the operation status of the signal conversion element.

Accordingly, even if the fault occurs in the signal conversion element, the operation status is not known to the central processing unit, so the fault cannot be directly detected.

Therefore, even if a fault occurs in a signal conversion element, it appears from the central processing unit that data is being normally transmitted. As a result, the occurrence of a fault cannot be informed to the operator of the data transmission apparatus or the repairman.

Further, all transmission of data on the data transmission line stops due to the fault. Externally, it appears as if an abnormality has occurred at all the data transmission apparatuses 1 in the computer system including the faulty data transmission apparatus. Therefore, it is extremely difficult to specifically determine the faulty data transmission apparatus. To deal with this, it may be considered to successively disconnect the data transmission apparatuses 1(A) to 1(D) from the data transmission line 2, detect the normality/abnormality of the data transmission apparatuses 1, and, when detecting an abnormality, determining that the abnormality lay there. With this method, however, tremendous time is taken for the restoration of the overall computer system from the abnormal state to the normal state.

Figure 2:
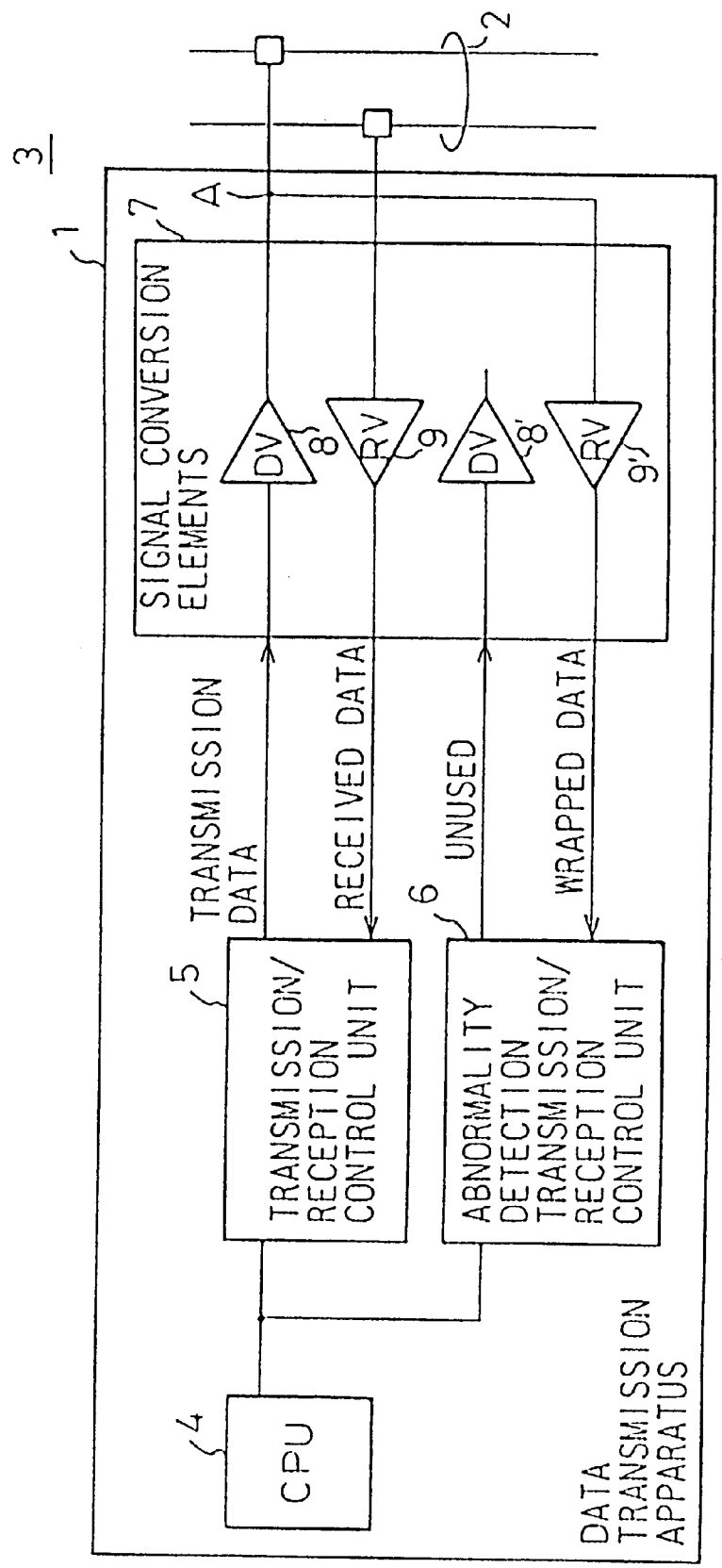
FIG. 2 is a view of the configuration of data transmission apparatus prepared as a prototype by the inventor and serving as a given condition of the present invention.

FIG. 2 is a view of the configuration of a data transmission apparatus prepared as a prototype by the inventor and serving as a given condition of the present invention. In the figure, 1 is a data transmission apparatus, 2 is a data transmission line, 4 is a central processing unit (CPU), 5 is a transmission/reception control unit, 6 is an abnormality detection transmission/reception control unit, and 7 is a signal conversion element. The signal conversion element 7 is provided with drivers (DV) 8, 8' and receivers (RV) 9, 9'.

In the prototype data transmission apparatus 1 shown in FIG. 2, to prevent the data transmission operation from stopping due to a fault, a special abnormality detection transmission/reception control unit 6 is provided for detecting abnormalities in the data transmission. Here, the data transmission apparatus 1 wraps the transmission data output from the driver (DV) 8 in the signal conversion element 7 to the data transmission line 2 at the point A and inputs that wrapped data to the abnormality detection transmission/reception control unit 6 through a receiver (RV) 9' exclusively used for wrap reception, provided separate from the receiver (RV) 9 for reception of the data from the data transmission line 2.

In the data transmission apparatus 1 of FIG. 2, the central processing unit 4 both receives the wrapped data received through the transmission/reception control unit 6 and checks for coincidence between the transmission data sent earlier by the central processing unit 4 and the wrapped data so as to detect abnormalities in the data transmission.

Figure 3:
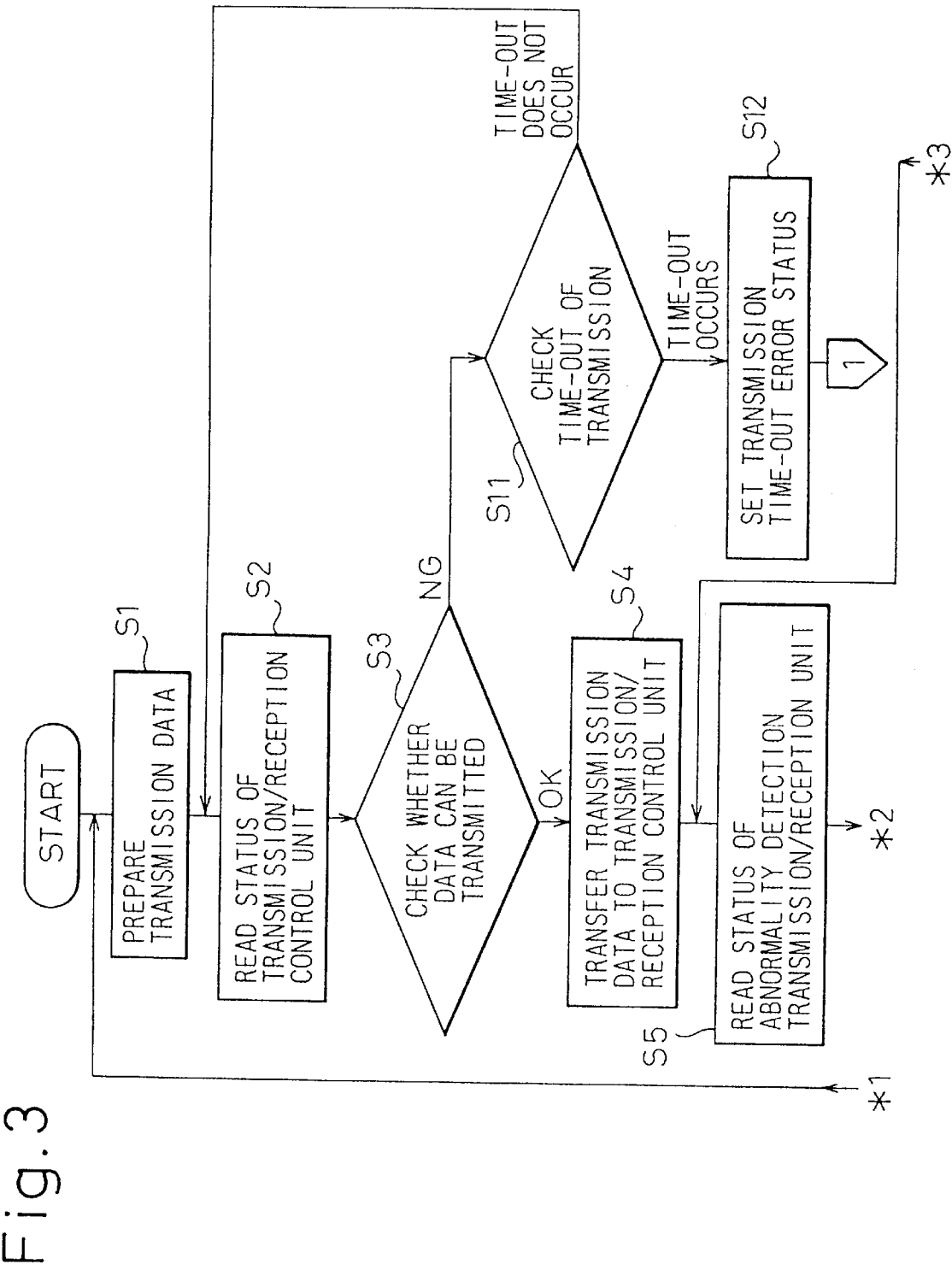
FIG. 3 is a flow chart (part 1) of the operation for detection of an abnormality in the data transmission apparatus shown in FIG. 2.
Figure 4:
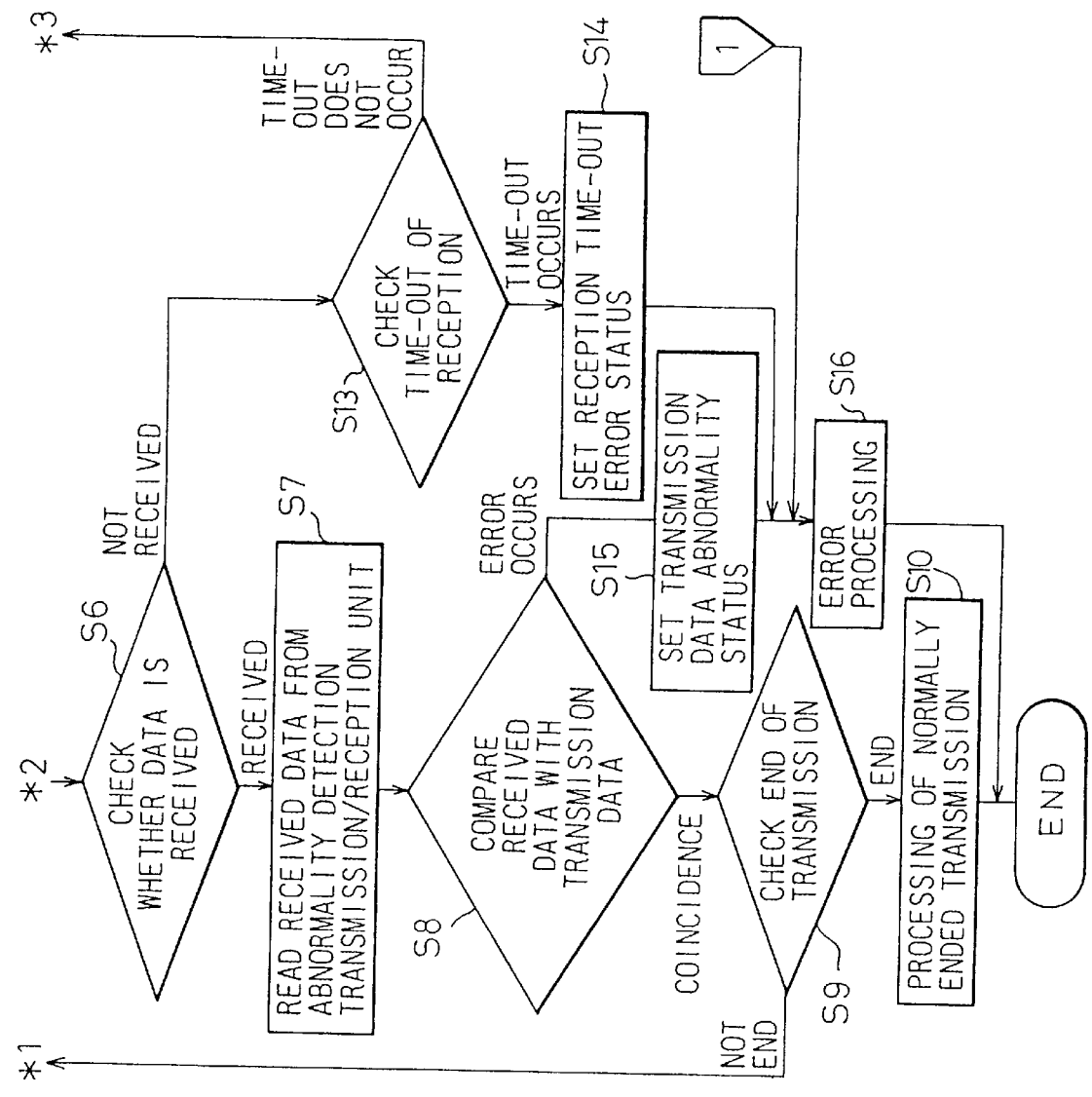
FIG. 4 is a flow chart (part 2) of the operation for detection of an abnormality in the data transmission apparatus shown in FIG. 2.

FIG. 3 and FIG. 4 are parts of a flow chart of the operation for detection of an abnormality in the data transmission apparatus shown in FIG. 2. At step S1 of FIG. 3, the central processing unit 4 prepares the data for transmission through the data transmission line 2. Next, at step S2, the central processing unit 4 reads the status of the transmission/reception control unit 5 (ready or busy) and determines if data may be transmitted. When it is decided at step S3 that data cannot be transmitted (NG), the routine proceeds to step S11, where a check is made as to if the time for transmission has run out. This is for checking if the NG state changes to an OK state, when transmission is not possible (NG), after waiting for the maximum time until the buffer (not shown) in the transmission/reception control unit 5 becomes empty. When the time runs out, a transmission time-out error status is set at step S12 and the routine proceeds to step S16.

When it is determined at step S3 that data can be transmitted (OK), the transmission data is transferred to the transmission/reception control unit 5 at step S4. Next, at step S5, the status (ready or busy) of the abnormality detection transmission/reception control unit 6 is read and it is judged by the central processing unit 4 if the abnormality detection transmission/reception control unit 6 has received data (ready) or not (busy).

When it is judged at step S6 that data has been received, the received data (wrapped data) is read from the abnormality detection transmission/reception control unit 6 at step S7 and the transmission data sent earlier from the central processing unit 4 and the wrapped data are compared at step S8. Next, when it is determined at step S8 that the result of comparison of the two data is noncoincidence and that an error has occurred, a transmission data abnormality status is set at step S15 and an alarm is issued or other error processing performed at step S16.

When it is determined at step S8 that the transmission data and the wrapped data coincide, the transmission is normal and it is determined at step S9 is the transmission is ended or not. When the transmission if not ended, that is, when the transmission of the first transmission data to the line 2 is not yet completed, the routine returns once again to step S1. On the other hand, when it is determined that the transmission has ended (transmission of the first transmission data has been completed), processing is performed for normally ended transmission at step S10 (the transmission is usually performed by interruption, so the interruption is released etc.) and the transmission of the data is ended.

When it is determined at step S6 that no data is received (no wrapped data is received), it is checked at step S13 if the time for reception has run out. This is for ensuring that the total time (10 ms) of the maximum time until the buffer (not shown) in the transmission/reception control unit 6 becomes empty (for example, 5 ms) and the maximum time in the transmission/reception control unit 5 mentioned earlier (5 ms) elapses. Here, when it is determined that the time has run out, the reception time-out error status is set at step S14 and the routine proceeds to step S16, where the above-mentioned error processing is performed.

The data transmission apparatus shown in FIG. 2, as mentioned above, introduced a transmission/reception control unit 6 for detection of abnormalities and introduced a driver (DV) 8' and receiver (RV) 9' constituting a signal conversion element 7 so as to detect abnormalities in the data transmission. This abnormality detection transmission/reception control unit 6 performs substantially the same function as a transmission/reception control unit 5 for normal data transmission and reception, so the abnormality detection transmission/reception control unit 6 can be realized using exactly the same LSI as the LSI constituting a normal transmission/reception control unit 5. This LSI, however, includes a set of the transmission side circuits and reception side circuits and is considerably expensive. In addition, in the LSI constituting the abnormality detection transmission/reception control unit 6, use is made of only the reception side circuits, i.e., the transmission side circuits were left unused, so the cost performance is poor. Accordingly, among the pair of the driver (DV) 8' and receiver (RV) 9' provided with the abnormality detection transmission/reception control unit 6, the driver 8' is left unused and wasted. In the end, there is the problem that the cost of the data transmission apparatus increased and is no longer practical.

Also, when transmitting data from the central processing unit 4, the central processing unit 4 both processes the data transmission and receives wrapped data obtained by wrapping the data it has itself transmitted. It is further necessary to check for coincidence of the transmission data and the wrapped data. Therefore, a complicated control program becomes required for the control of the transmission, reception, coincidence checking, and other operations. In addition, the central processing unit 4 has to be given a large processing capability. Therefore, the load on the central processing unit 4 increases and the cost of the central processing unit 4 rises. In this respect as well, it is difficult to realize an inexpensive data transmission apparatus.

Further, when detecting abnormalities in data transmission, human intervention was required to disconnect the abnormal data transmission apparatus 1 from the data transmission line 2. Accordingly, considerable time was taken for restoration of the overall computer system.

Accordingly, the present invention is designed to enable the prompt detection of faults occurring in data transmission apparatuses 1 connected in common to a data transmission line 2 without increasing the cost of the equipment and without increasing the load on the central processing unit 4 and, further, to enable the faulty data transmission apparatus 1 to be automatically disconnected from the data transmission line 2 and for the computer system to be promptly restored.

Figure 5:
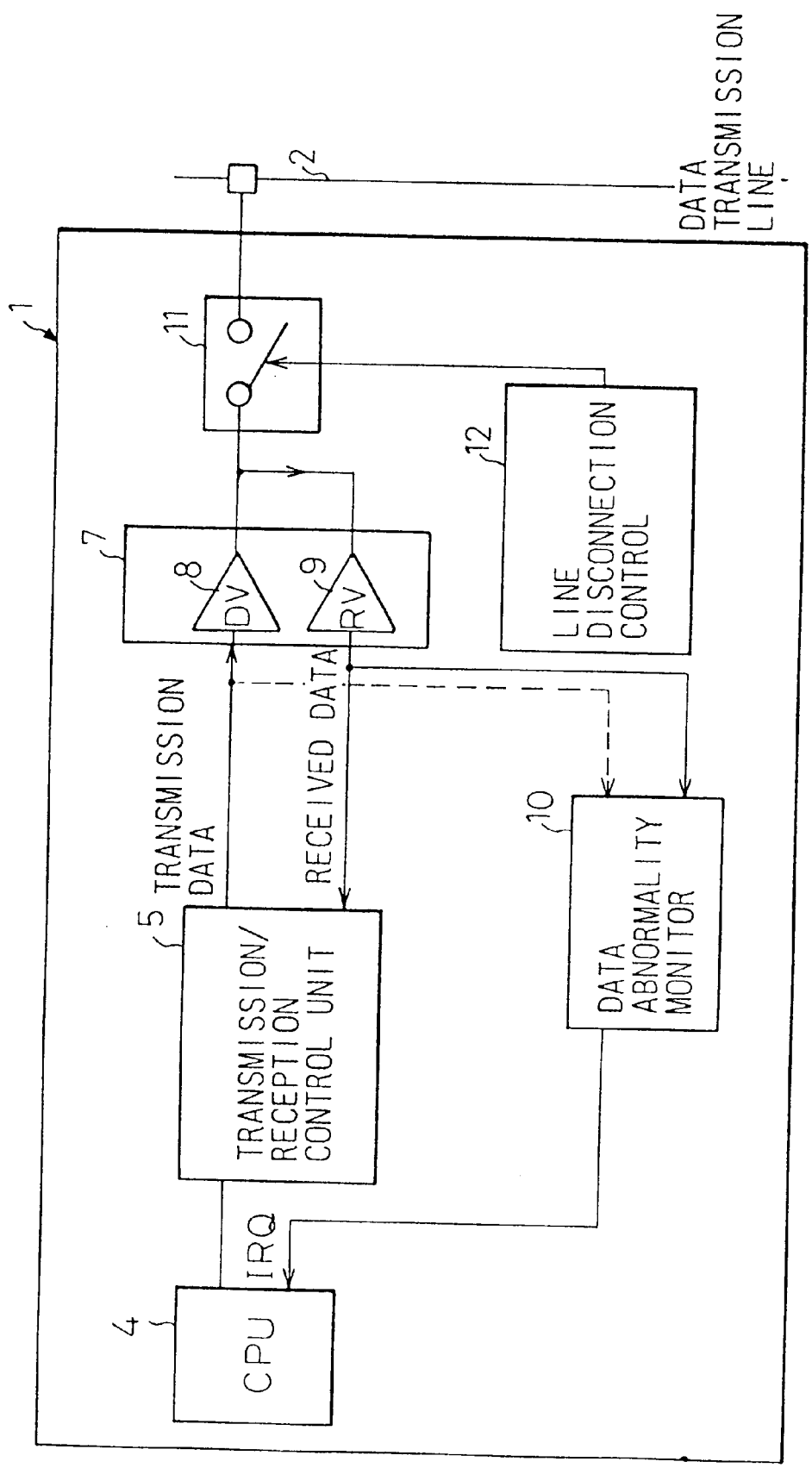
FIG. 5 is a view for explaining the principle of the present invention.

FIG. 5 is a view for explaining the principle of the present invention. In the figure, 4 is a central processing unit (CPU), 5 is a transmission/reception control unit, 8 is a driver (DV), 9 is a receiver (RV), 10 is a data abnormality monitoring means, 11 is a switch means, and 12 is a line disconnection control means. Note that, as mentioned earlier, 1 is a data transmission apparatus and 2 is a data transmission line. FIG. 5 shows the example of data transmission apparatuses connected to a half duplex communication line.

The different aspects of the present invention will be explained below.

According to the first aspect, there is provided a computer system having a facility for detection of data abnormalities, provided with a data transmission line 2 and a plurality of data transmission apparatuses 1 connected in common to the data transmission line 2, wherein each data transmission apparatus 1 is provided with a data abnormality monitoring means 10, transmission data output from a data transmission apparatus 1 to the data transmission line 2 is wrapped in the data transmission apparatus 1 to produce wrapped data, and the wrapped data is input to the data abnormality monitoring means 10, the correlation with the transmission data is monitored, and, when there is no correlation, it is determined that an abnormality has occurred in the transmission of data.

In the second aspect of the invention, when data is transmitted by the frame synchronization system, one and the other of two bit patterns other than all "0" and all "1" are assigned to the start flag and stop flag added before and after the transmission data, respectively.

In the third aspect of the invention, the data abnormality monitoring means 10 detects points of change of the input wrapped data and, when the number of points of change detected is less than a predetermined reference value, determines that there is no correlation and an abnormality has occurred in the transmission of data.

In the fourth aspect of the invention, the reference value is one value selected from among a plurality of predetermined reference values.

In the fifth aspect of the invention, the data abnormality monitoring means 10 compares the transmission data output from the data transmission apparatus 1 to the data transmission line 2 and the wrapped data produced by wrapping in the data transmission apparatus 1 and, when the two do not coincide, determines that there is no correlation and an abnormality has occurred in the transmission of data.

In the sixth aspect of the invention, the transmission data and the wrapped data are synchronized and the two are sequentially compared bit by bit.

In the seventh aspect of the invention, a switch means 11 is provided in each data transmission apparatus 1 at the connecting portion with the data transmission line 2, the switch means 11 being opened to disconnect the data transmission apparatus 1 and the data transmission line 2 when the data abnormality monitoring means 10 determines that there is no correlation.

In the eighth aspect of the invention, a wrap test of the transmission data is executed in the data transmission apparatus 1 in the state with the switch means 11 opened and the switch means 11 is once again closed to connect with the data transmission line 2 when no abnormality is detected in the data transmission as a result of the wrap test.

In the ninth aspect of the invention, there is provided a computer system having a facility for detection of data abnormalities, provided with a data transmission line 2 and a plurality of data transmission apparatuses 1 connected in common to the data transmission line 2, wherein each data transmission apparatus 1 is provided with a central processing unit 4 for transmission and reception of data with the data transmission line 2, a transmission/reception control unit 5 connected with the central processing unit 4 and controlling transmission and reception of the transmission data and received data, a driver 8 for outputting the transmission data to the data transmission line 2, a receiver 9 for receiving as input the data received from the data transmission line 2, and a data abnormality monitoring means 10 for receiving as input the data received from the receiver 9, monitoring the correlation with the transmission data, and, when there is no correlation, determining that an abnormality has occurred in the transmission of the data.

In the 10th aspect of the invention, the data abnormality monitoring means 10 is comprised of a changing point detecting unit which detects the points of change of the input received data, which means determines that an abnormality has occurred in the transmission of data when the number of points of change is less than a predetermined reference value.

In the 11th aspect of the invention, the data transmission apparatus 1 is further provided changing point frequency selector for detecting that the number of points of change is less than a predetermined reference value and a changing point frequency latch for holding the results of detection once and interrupting the central processing unit 4.

In the 12th aspect of the invention, the data abnormality monitoring means 10 is comprised of a comparator 63 which compares the input received data and the transmission data at the input side of the driver 8 and determines that an abnormality has occurred in the transmission of data when the result of the comparison is that there is no coincidence.

In the 13th aspect of the invention, the transmission data and the received data are synchronized and a transmission data latch and received data latch are provided for temporarily holding the two at the input side of the comparator.

In the 14th aspect of the invention, the data transmission apparatus 1 is further provided with a switch means 11 inserted between the commonly connected driver 8 output side and receiver 9 input side and the data transmission line 2 and a line disconnection control means 12 for controlling the opening and closing the switch means 11, the switch means 11 being opened through the line disconnection control means 12 when it is determined by the data abnormality monitoring means 10 that an abnormality has occurred in the transmission of data.

In the 15th aspect of the invention, a wrap test is executed in the data transmission apparatus 1 by the central processing unit 4 in the state with the switch means 11 opened.

More specifically, regarding the mode of operation, in the above first aspect of the invention, a data abnormality monitoring means 10 is introduced in the transmission apparatus 1. In FIG. 5, if the transmission data is sent normally to the data transmission line 2, the data received by the receiver 9 wrapped at the data transmission line 2 side should also be normal.

Therefore, the data abnormality monitoring means 10 monitors for the presence of a correlation between the transmission data and the received data and if there is no correlation judges that there is an abnormality in the transmission of the data. Note that in the present invention, two specific measures (FIG. 6 and FIG. 7) are proposed as measures for monitoring the presence of a correlation.

In the second aspect of the invention, at least one bit of the logic "1" is included in the start flag and the stop flag so that at least one signal changing point appears in the received data. In this case, the appearance of the signal changing point shows that the transmission data is normally transmitted.

The third aspect of the invention is the first specific measure for monitoring the presence of correlation, in which note is taken of the fact that as mentioned in reference to the above second aspect of the invention, if the number of the points of change where the wrapped data of the transmission data (received data) changes from the logic "1" to "0" and vice versa is investigated and found to be over a certain extent, the transmission of the data can be regarded as normal.

In the fourth aspect of the invention, the optimal reference value is selected in accordance with the state of the computer system. For example, when the system suffers from a lot of noise, the reference value is made large.

The fifth aspect of the invention is the second specific measure for monitoring the correlation, in which the transmission data and the received data are directly compared with each other. It takes note of the fact that if the transmission data is output normally, the received data and the transmission data should coincide.

In the above sixth aspect of the invention, the comparison in the fifth aspect of the invention is a bit by bit sequential comparison which is high in precision and extremely fast in speed of detection of abnormalities.

In the above seventh aspect of the invention, when an abnormality of the data transmission is detected, the transmission apparatus 1 is automatically promptly disconnected from the data transmission line 2. It therefore becomes possible to hold to a minimum extent the effect caused by a fault in a certain single data transmission apparatus.

In the above eighth aspect of the invention, a data transmission apparatus 1 utilizes the fact that it is completely isolated from the other data transmission apparatuses so as to conduct a wrap test by itself to perform self-diagnosis as to its own normality/abnormality.

In the above ninth aspect of the invention, provision is made of specific hardware for realizing the above measure.

In the above 10th aspect of the invention, provision is made of a changing point detecting unit for detecting the point of change of the received data.

In the above 11th aspect of the invention, provision is made of hardware for selecting one of a plurality of reference values.

In the above 12th aspect of the invention, provision is made of specific hardware for detecting coincidence/noncoincidence of the transmission data and the received data.

In the above 13th aspect of the invention, provision is made of hardware for realizing bit by bit sequential comparison in the 12th aspect of the invention.

In the above 14th aspect of the invention, provision is made of the line disconnnection control means 12 for controlling the opening and closing of the switch means 11.

In the above 15th aspect of the invention, provision is made of a data transmission apparatus provided internally with the above-mentioned wrap test function.

Figure 6:
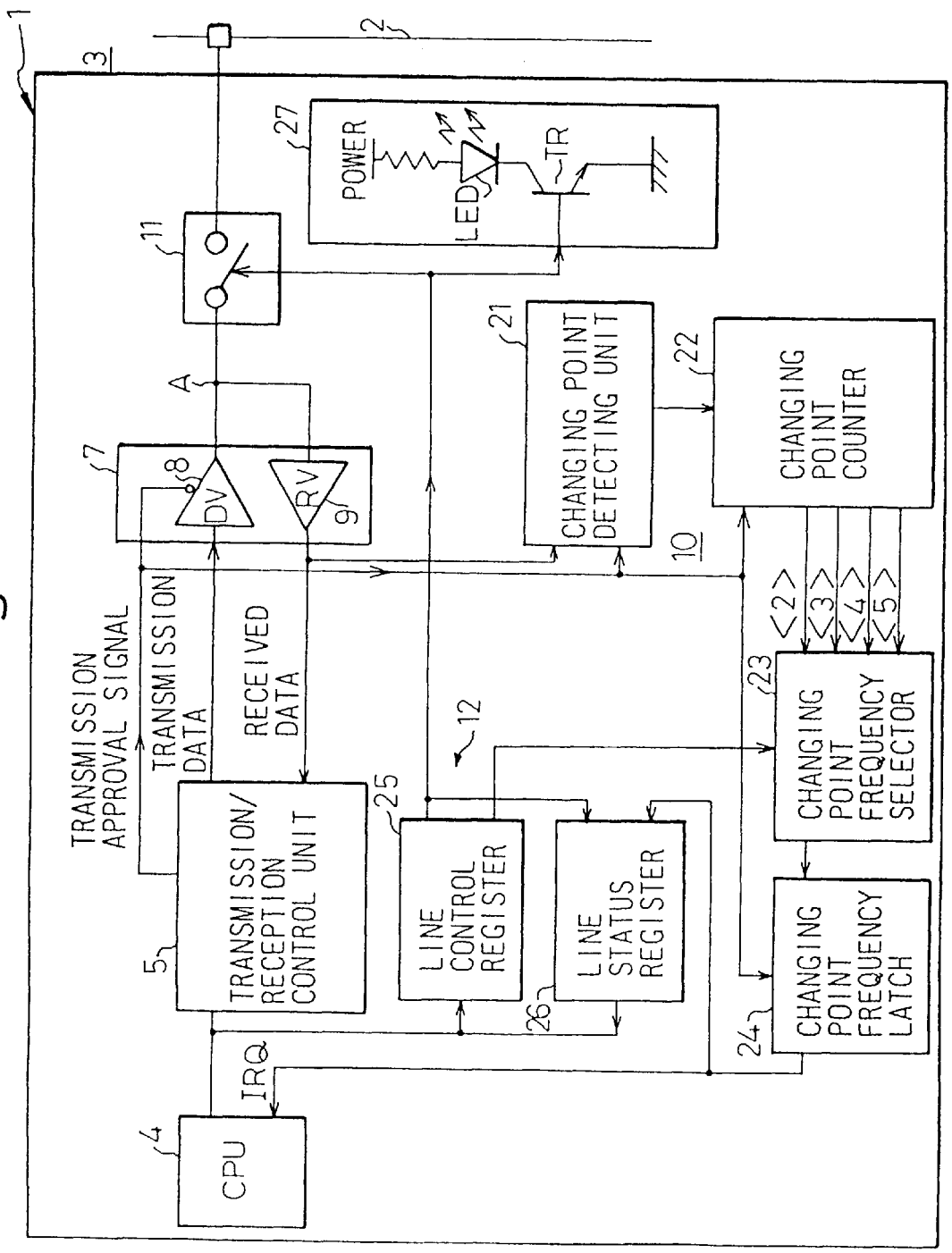
FIG. 6 is a view of a first embodiment of the present invention.

FIG. 6 is a view of a first embodiment of the present invention. In the first embodiment, the transmission data output from the driver 8 to the data transmission line 2 by the central processing unit 4 through the transmission/reception control unit 5 is wrapped at point A and received at the receiver 9. The wrapped received data is input to the changing point detecting unit 21. At the changing point detecting unit 21, the points of change of the logic in the wrapped data are detected. When the points of change of the received data detected by the changing point detecting unit 21 are less than a predetermined number, that is, a reference value, the changing point detecting unit 21 interrupts the central processing unit 4.

On the other hand, the central processing unit 4, upon receipt of this interruption, recognizes that an abnormality has occurred in the data transmission, controls the line disconnection control means 12 to turn off (open) the switch means 11, and disconnects the data transmission apparatus 1 from the data transmission line 2.

In the first embodiment, it is essential that the points of change of the received data can be detected, so a supplementary explanation will be made on this point.

Figure 7:
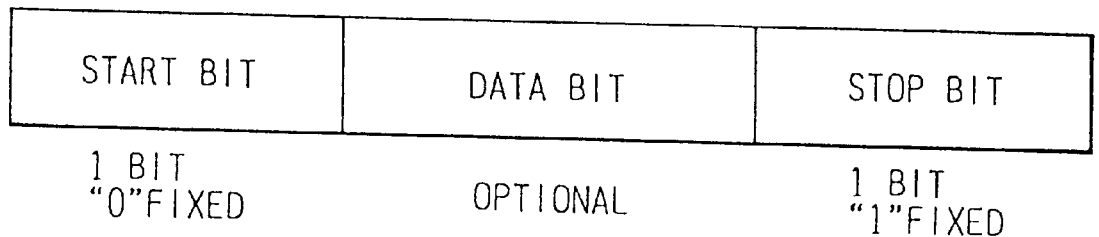
FIG. 7 is a view of the format of data used in a start-stop synchronization system.
Figure 8:
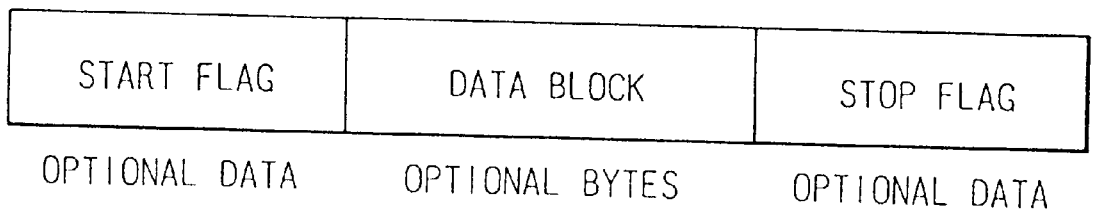
FIG. 8 is a view of the format of data used in a frame synchronization system.

FIG. 7 is a view of the format of data used in a start-stop synchronization system, and FIG. 8 is a view of the format of data used in a frame synchronization system. In data transmission by polling, using a data transmission line, either this start-stop synchronization system (FIG. 7) or frame synchronization system (FIG. 8) is used.

In the start-stop synchronization system of FIG. 7, a start bit and a stop bit are added before and after the data. The start bit is fixed to "0", while the stop bit is fixed to "1". The data bits may be any logic. Since this data configuration is adopted, there are a minimum of two points of change where the received data changes from "1" to "0" and from "0" to "1" in each byte of data in the start-stop synchronization system.

Similarly, in the frame synchronization system of FIG. 8, a start flag and a stop flag are added before and after the data block. The start flag and the stop flag are assigned one and another of two bit patterns other than all "1" and all "0" respectively, so that there are a minimum of two points of change of the received data between the start flag and the stop flag in the data of the frame synchronization system.

The first embodiment takes note of the existence of these points of change. The changing point detecting unit 21 counts the number of the points of change of the logics "1" and "0" in the wrapped received data. When a fault in the data transmission apparatus 1 causes for example the logic "0" to be continuously output, there is no point of change in the wrapped data, so the frequency of detection of the points of change is low. It is possible to detect an abnormality in data transmission from this.

This enables an abnormality in the data transmission to be detected while preventing an increase in the load of the central processing unit 4 and an increase in cost of the data transmission apparatus 1.

Further, it is possible to detect that an abnormality has occurred in the data transmission by comparing by a comparator the wrapped data before the input of the transmission data to the driver 8 and the wrapped data through the receiver 9 and interrupting the central processing unit 4 from the comparator depending on the result of the comparison. This will be explained later as a second embodiment.

Further, by automatically disconnecting the data transmission apparatus 1 and the data transmission line 2 based on the detection of an abnormality in the data transmission, it is possible to disconnect the faulty data transmission apparatus 1 (see FIG. 1) promptly from the data transmission line 2 without human intervention. Accordingly, it is possible to hold to a minimum the effect on the data transmission of the other normal data transmission apparatuses and possible therefore to restore data transmission in a short time.

FIG. 6 will be explained in further detail below. In the figure, the signal conversion element 7 is provided with a driver 8 and a receiver 9. These perform conversion between the signals handled by the central processing unit 4 and the transmission/reception control unit 5 of the data transmission apparatus 1 and the signals used on the data transmission line 2, for example, level conversion.

The central processing unit 4 controls the data transmission apparatus 1 as a whole. The switch means 11 is interposed between the data transmission apparatus 1 and the data transmission line 2. By turning the switch means 11 off, the data transmission apparatus 1 and the data transmission line 2 are disconnected.

At the time of data transmission, the central processing unit 4 outputs the transmission data to the transmission/reception control unit 5 as parallel data.

The transmission/reception control unit 5 converts the parallel data sent from the central processing unit 4 to serial data and sends the converted data to the driver 8 in the signal conversion element 7. When the central processing unit 4 outputs the transmission data to the data transmission line 2, it turns the transmission approval signal on and enables operation of the driver 8.

The received data from the data transmission line 2 is sent through the receiver 9 of the signal conversion element 7 to the transmission/reception control unit 5 and is output from the transmission/reception control unit 5 to the central processing unit 4.

The transmission data from the driver 8 is output through the switch means 11 to the data transmission line 2 and is wrapped at the point A and sent to the receiver 9.

The output of the receiver 9 is sent as received data to the transmission/reception control unit 5 and is sent to the changing point detecting unit 21 of the received data as well.

The changing point detecting unit 21 of the received data receives as input the output signal from the receiver 9 and the transmission approval signal. The changing point detecting unit 21 detects the points of change contained in the output signal of the receiver 9 only in the period while the transmission approval signal becomes on, issues a changing point detection signal upon detection of a point of change, and outputs the same to the changing point counter 22. The changing point counter 22 receives as input the changing point detection signal and the transmission approval signal. The changing point counter 22 counts the number of changing point detection signals input from the changing point detecting unit 21 only during the period while the transmission approval signal is on. When the transmission approval signal changes from on to off, the count until then (<2>, <3> ... <5>) is output to the changing point frequency selector 23 and the changing point counter 22 is reset.

The transmission approval signal is turned on only in the period while a series of transmission data is being output. Therefore, after the transmission approval signal becomes off, the count sent from the changing point counter 22 to the changing point frequency selector 23 shows the number of points of change of the logic existing in the series of transmission data.

The central processing unit 4 sets the reference number of the points of change detected in the changing point frequency selector 23 through the line control register 25. In the frame synchronization system (FIG. 8), as mentioned earlier, there are a minimum of two points of change in the series of transmission data. Therefore, it is possible to set these two points as the reference frequency (reference value). When considering the fact that noise may be mixed in the received data, however, if the reference frequency (reference) is set to 2, when noise is mistaken as a point of change, there is a chance that it may be determined that an abnormality has occurred even when an abnormality in data transmission should not be detected. Therefore, the reference frequency set in the changing point frequency selector 23 is preferably one with some margin for error (see <3> ... <5> in the figure).

In the changing point frequency selector 23, the count sent from the changing point counter 22, that is, the number of times a point of change has been detected, and the reference frequency (reference value) set under instruction of the central processing unit 4 are compared. When the number of times a point of change has been detected is less than the reference frequency, the detected number of times of points of change is output to the changing point frequency latch 24.

The changing point frequency latch 24 issues an interruption request signal (IRQ) to the central processing unit 4. The central processing unit 4 recognizes an abnormality in the data transmission based on the interruption request signal from the changing point frequency latch 24.

Next, the central processing unit 4 controls the switch means 11 through the line control register 25 and disconnects the data transmission apparatus 1 from the data transmission line 2. At the same time, a transistor TR of an alarm unit 27 is turned on, an LED flashes, and the operator is thereby informed that the line is disconnected.

Note that the output of the changing point frequency latch 24 is also sent to the line status register 26 and, as mentioned later, is used for confirming if there is an error in the interruption request (IRQ) from the changing point frequency latch 24.

By the above operation, the data transmission apparatus 1 detects abnormalities in the data transmission and disconnects from the data transmission line 2. Abnormalities in data transmission occur not only due to an apparatus' own fault, but also due to faults in other data transmission apparatuses. For example, if a fault occurs in a driver of another data transmission apparatus and the logic "0" is continuously output, the normal data transmission apparatus 1 receives the logic "0" output by the other faulty data transmission apparatus and detects a line abnormality by the received signal. (See FIG. 1.) In this case too, the central processing unit 4 determines that there is an abnormality in the data transmission. With this alone, however, it is not possible to distinguish whether the abnormality in the data transmission occurred due to there being a fault in one's own apparatus or a fault in another apparatus.

Accordingly, the data transmission apparatus 1 disconnected from the data transmission line 2 repeats a wrap test of the transmission data in the disconnected state. Details on the procedure for this wrap test will be given later. When an abnormality is detected in the data transmission as a result of a wrap test in the state disconnected from the data transmission line 2, it is determined that one's own apparatus is faulty and the data transmission apparatus 1 is kept disconnected from the data transmission line 2. This enables prevention of a fault from influencing other apparatuses.

When no abnormality is detected in the data transmission in the wrap test in the state disconnected from the line 2, it is determined that there is no fault in one's own apparatus. Therefore, the central processing unit 4 controls the switch means 11 and once again connects its own apparatus to the data transmission line 2.

Figure 9:
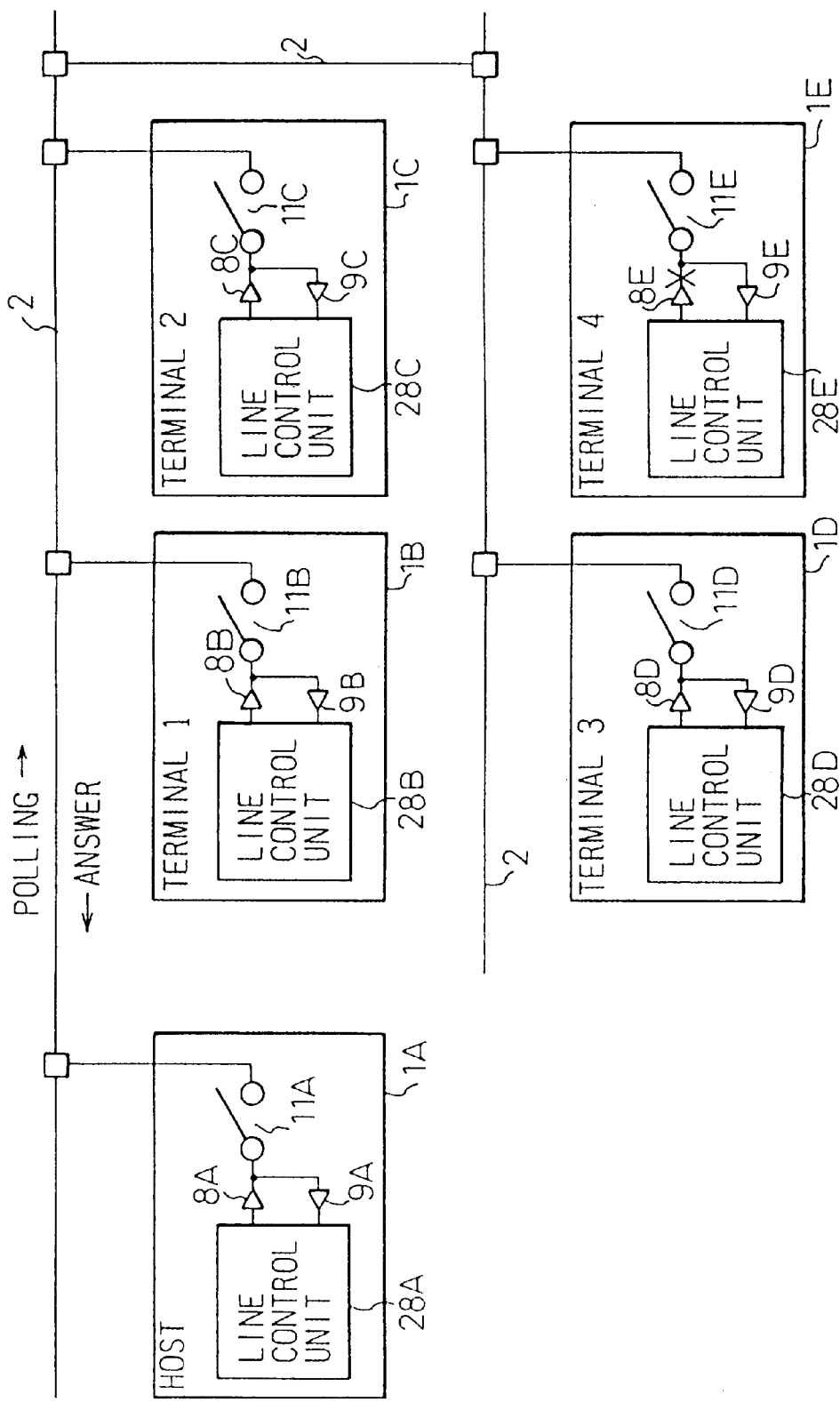
FIG. 9 is a view of an example of a configuration of a computer system containing a data transmission apparatus according to the present invention.

FIG. 9 is a view of an example of a configuration of a computer system containing a data transmission apparatus according to the present invention. In FIG. 9, 1A is a host apparatus and 1B to 1E are terminals of the host apparatus 1A. If taking as an example of point of sale (POS) system, 1A is a POS server and 1B to 1E are POS terminals. Further, 11A to 11E are switch means, 8A to 8E are drivers, and 28A to 28E are line control units, which include the central processing units 4, the transmission/reception control units 5, etc.

The computer system of FIG. 9 operates under half duplex communication by the polling/answer system and frame synchronization system (FIG. 8). That is, the host apparatus 1A inquires as to the presence of transmission data or received data to the terminals 1B to 1E in order by polling through the data transmission line 2. The terminals 1B to 1E return to the host apparatus 1A response data (answer) showing the existence of transmission or received data. If there is transmission data, the transmission data is then sent to the host apparatus 1A.

When the polling time assigned to one terminal (1B to 1E) is 0.5 second, each terminal is polled at a rate of once every 2 (0.5×4) seconds. Further, since the frame synchronization system is adopted, a minimum of two changes in logic of the received data appear in one data transmission.

Here, consider the case where a fault occurs in the driver 8E of the terminal 1E after the polling of the terminal 1B ends and in the period where polling of a terminal 1C is performed and, according, a logic "0" is continuously output from the terminal 1E to the data transmission line 2. Note that the logic "0" is envisioned because if fixed to the logic "0", the outputs of the other terminals become fixed more powerfully to "0" compared with the case of fixing to the logic "1".

The host apparatus 1A performs the transmission of the polling data to the terminal 1B while monitoring the polling interval. At this time, since a fault occurs in the terminal 1E, the host apparatus 1A cannot receive the wrapped data of the received data sent by itself and therefore no point of change of logic appears in the wrapped data input to the changing point detecting unit 21 (FIG. 6) of the received data.

If this situation occurs, the above-mentioned operation for detection of abnormalities in the data transmission is performed and an interruption request (IRQ) is issued due to the fact that no point of change of the received data can be detected. By this, the central processing unit (4) of the host apparatus 1 controls the switch means 11A and disconnects itself from the data transmission line 2. Next, the host apparatus 1A performs a data wrap test in this state and discriminates if a fault has occurred in itself or if the abnormality has occurred in the data transmission due to the effect of a fault of another apparatus.

In this example, the driver 8A of the host apparatus 1A is normal, so the wrap test in the state of disconnection from the line 2 ends normally. Therefore, the host apparatus 1A confirms by self-diagnosis that it is itself normal, turns the switch means 11A on (closed), and once again connects itself to the data transmission line 2.

On the other hand, the terminals 1B to 1E detect when polling data, which is supposed to be received from the host apparatus 1A at a rate of once every two seconds, can no longer be received. Based on the detection, they determine that an abnormality has occurred in the data transmission, the terminals disconnect themselves from the data transmission line 2, perform wrap tests, and find if there is a fault in themselves by self-diagnosis. Terminals which determine that there is no fault in themselves once again connect themselves to the data transmission line 2. A terminal which determines that the fault has occurred in it remains disconnected from the data transmission line 2.

By this operation, the faulty terminal 1E is promptly disconnected from the data transmission line 2 and the data transmission between the host apparatus 1 and the other normal terminals 1B to 1D is once again restored in a short time.

Figure 10:
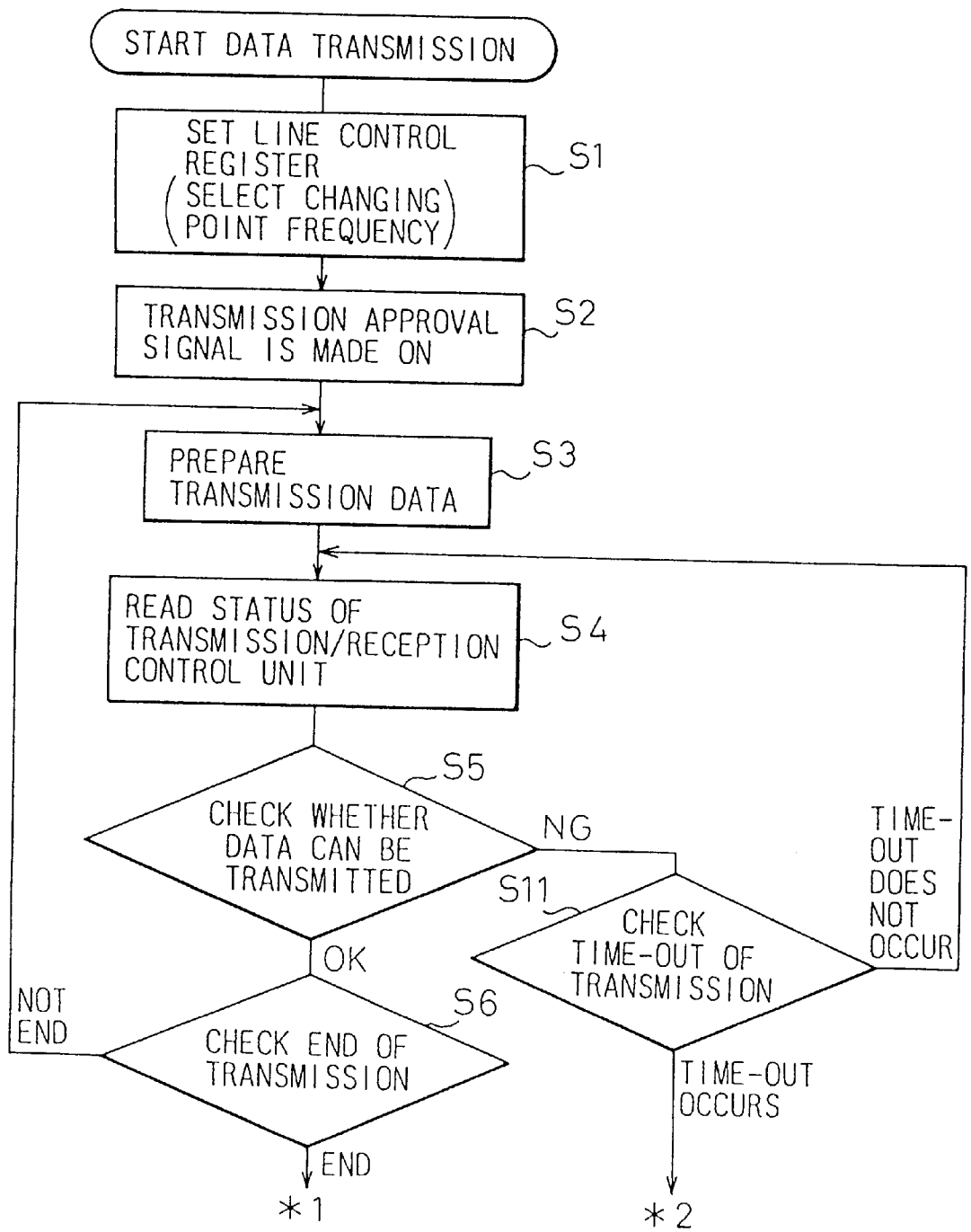
FIG. 10 is a flow chart (part 1) of a data transmission procedure in the first embodiment.
Figure 11:
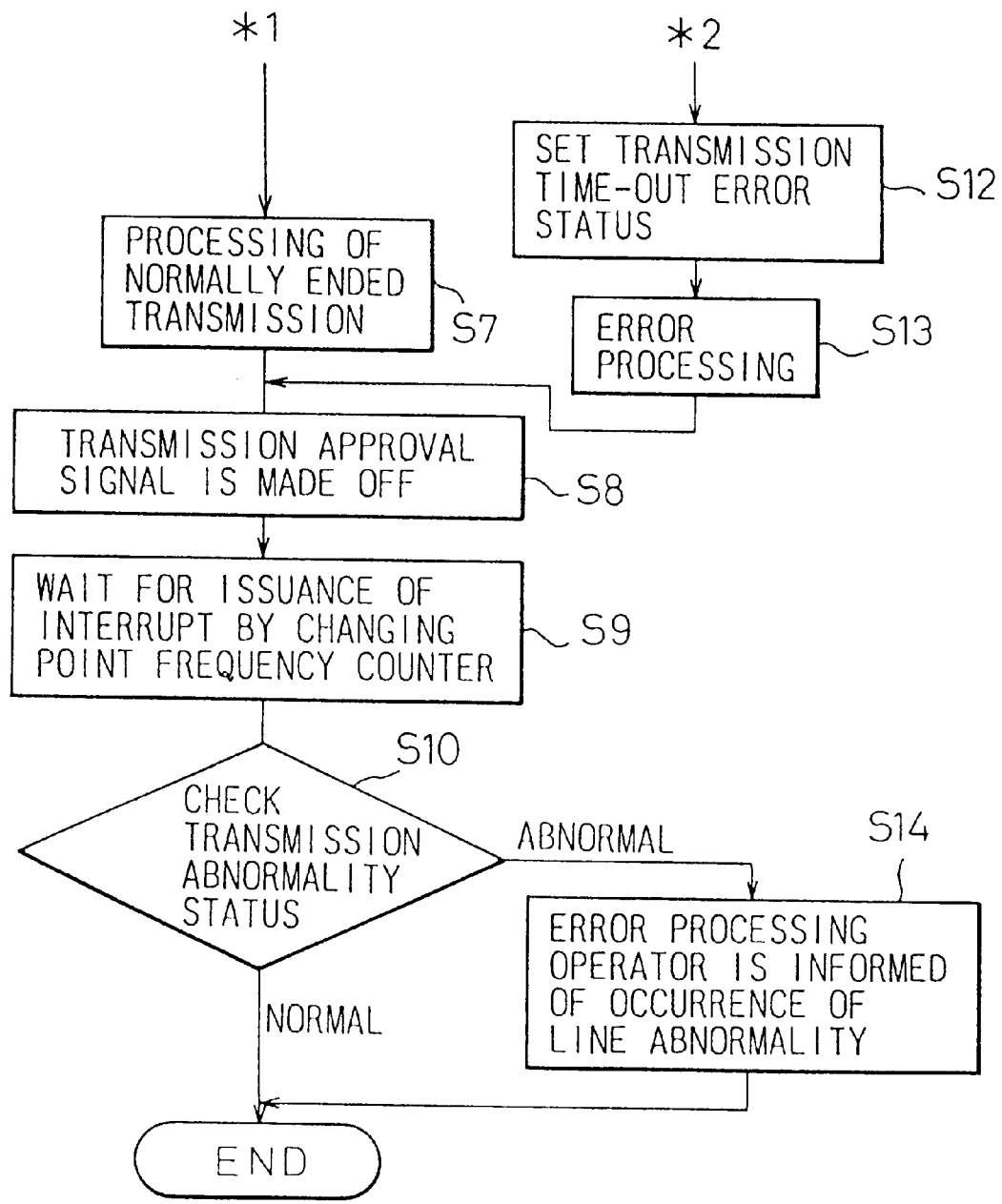
FIG. 11 is a flow chart (part 2) of a data transmission procedure in the first embodiment.

FIG. 10 and FIG. 11 are parts of a flow chart of a data transmission procedure in the first embodiment. When data transmission is started, at step S1, the central processing unit 4 sets the reference frequency (reference value) in the changing point frequency selector 23 through the line control register 25. Next, at step S2, the central processing unit 4 turns the transmission approval signal on.

At step S3, the transmission data is prepared (for example, data is read out from a memory under the control of the central processing unit). At step S4, the status of the transmission/reception control unit 5 is read and it is checked if the transmission data can be transmitted or not. At step S5, the possibility of data transmission is checked. If the result is that data transmission is not possible (NG), it is checked at step S11 if the time for transmission has run out. When it is determined that the time has not run out, the routine returns to step S4. On the other hand, when the time has run out, a transmission time-out error status is set at step S12, error processing is performed at step S13, and the routine returns to step S8.

When it is determined at step S5 that data transmission is possible (OK), it is checked at step S6 if the transmission has ended or not. When it is determined at step S6 that the transmission has not ended, the routine returns to step S3. On the other hand, when it is determined that the transmission has ended, the routine proceeds to step S7, where processing for normal ending of transmission is performed.

Next, at step S8, the central processing unit 4 turns off the transmission approval signal along with the end of the series of the transmission data. In accordance with this, the changing point counter 22 outputs the number of points of change detected, counted during the period in which the transmission approval signal was on, to the changing point frequency selector 23. The changing point frequency selector 23 compares the set reference frequency (reference value) and the count from the changing point counter 22 and when it finds that the count is smaller than the reference frequency outputs the count to the changing point frequency latch 24.

The central processing unit 4 waits for issuance of an interruption request (IRQ) from the changing point frequency latch 24 at step S9. In this state, when there is an interruption request from the changing point frequency latch 24, the central processing unit 4 performs a wrap test, mentioned later, and sets the result in the line status register 26. If there is no interruption request, the transmission operation is ended.

At step S10, the central processing unit 4 checks the content of the line status register 26. When it is determined that the status is normal, error processing is performed at step S11 and, as mentioned later, the occurrence of the line abnormality is informed to the operator by the lighting of an LED etc.

FIG. 12, FIG. 13, FIG. 14, and FIG. 15 are parts of a flow chart of the execution of a wrap test in the first embodiment.

Figure 12:
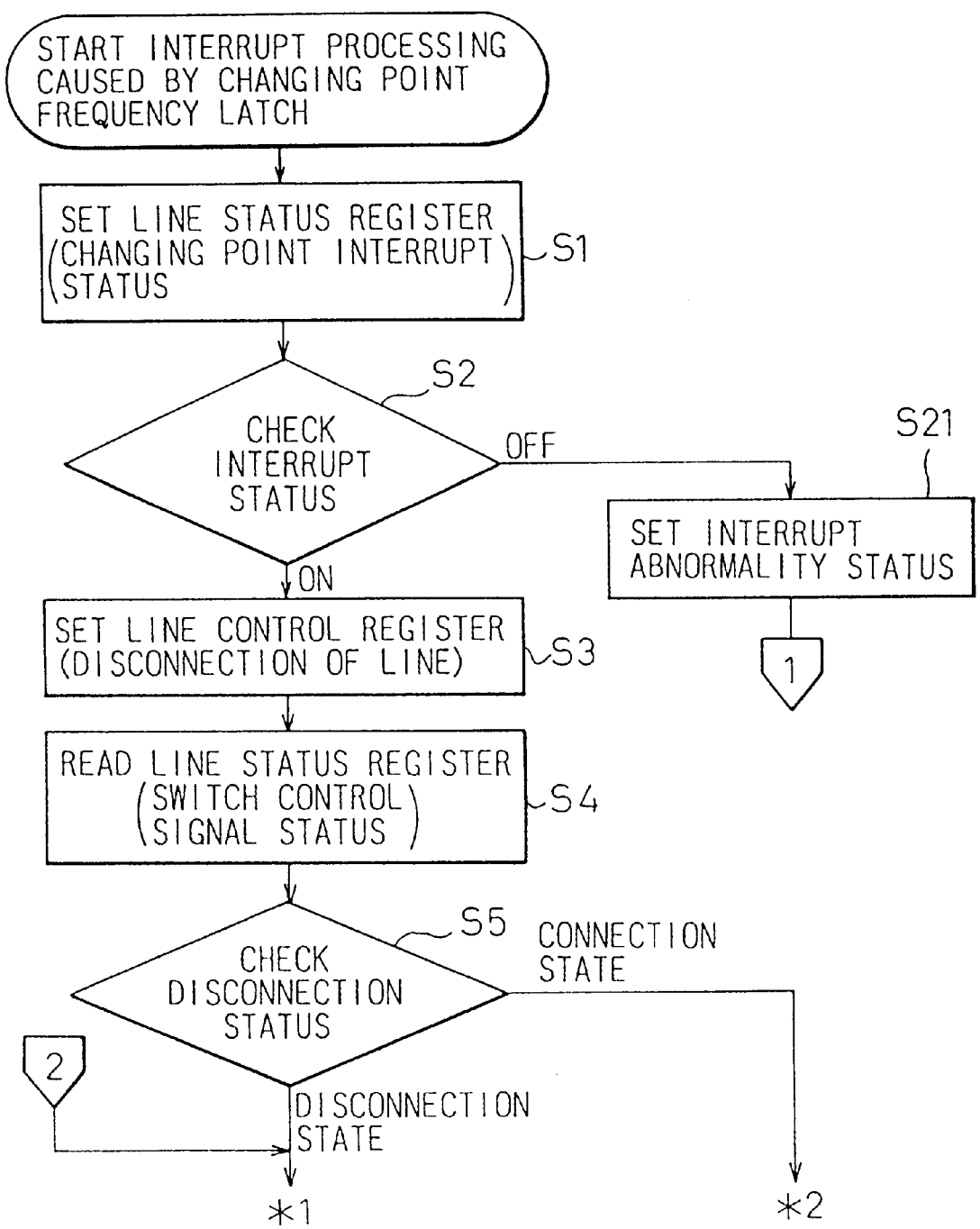
FIG. 12 is a flow chart (part 1) of the execution of a wrap test in the first embodiment.
Figure 13:
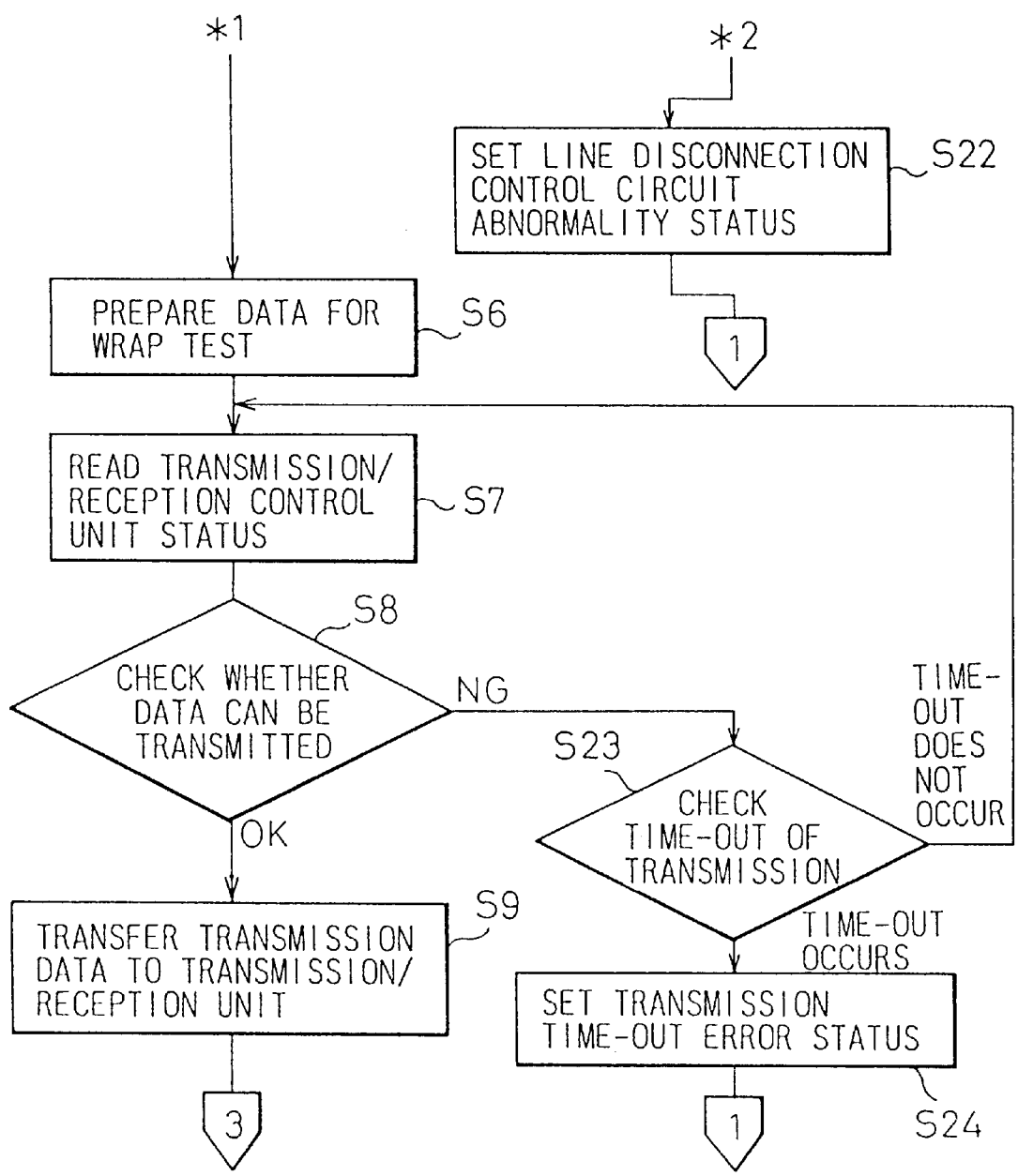
FIG. 13 is a flow chart (part 2) of the execution of a wrap test in the first embodiment.

In FIG. 12 and FIG. 13, when there is an interruption request (IRQ) from the changing point frequency latch 24 to the central processing unit 4, the content of the line status register 26 is read at step S1.

As shown in FIG. 6, the interruption request signal from the changing point frequency latch 24 is sent to the line status register 26 as well and the interruption status is written by the changing point frequency latch in the line status register 26. The central processing unit 4 checks the existence of the interruption status at step S2.

When the interruption status is off, the central processing unit 4 determines that an interruption abnormality has occurred, sets the interruption abnormality status at step S21, and proceeds to step S28.

When it is determined at step S2 that the interruption status is on, a line disconnection instruction is set in the line control register 26 at step S3. By this, the switch means 11 is controlled. Next, at step S4, the central processing unit 4 reads the line status register 26, checks the status of the switch control signal for opening and closing the switch means 11, and confirms the operation of the switch means 11.

At step S5, the disconnection status is checked. When as a result it is determined that the switch means 11 is in the connection state (on), a line disconnect control circuit (25, 26, etc.) abnormality status showing that an abnormality has occurred while the switch means 11 was connected is set at step S22 and the routine proceeds to step S28. On the other hand, when it is determined that it is in the disconnect state (off), the routine proceeds to step S6, where wrap test data is prepared for starting to wrap test.

Next, at step S7, the status of the transmission/reception control unit 5 is read and the possibility of data transmission for the wrap test is checked. When it is determined at step S8 that data transmission is not possible (NG), it is checked at step S23 is the transmission time has run out. When it is determined that the time has not run out, the routine returns to step S7. When the time has run out, at step S24, the central processing unit 4 sets a transmission time-out error status and proceeds to step S28.

On the other hand, when it is determined at step S8 that data transmission is possible (OK), the transmission data is transferred from the central processing unit 4 to the transmission/reception control unit 5 at step S9.

Figure 14:
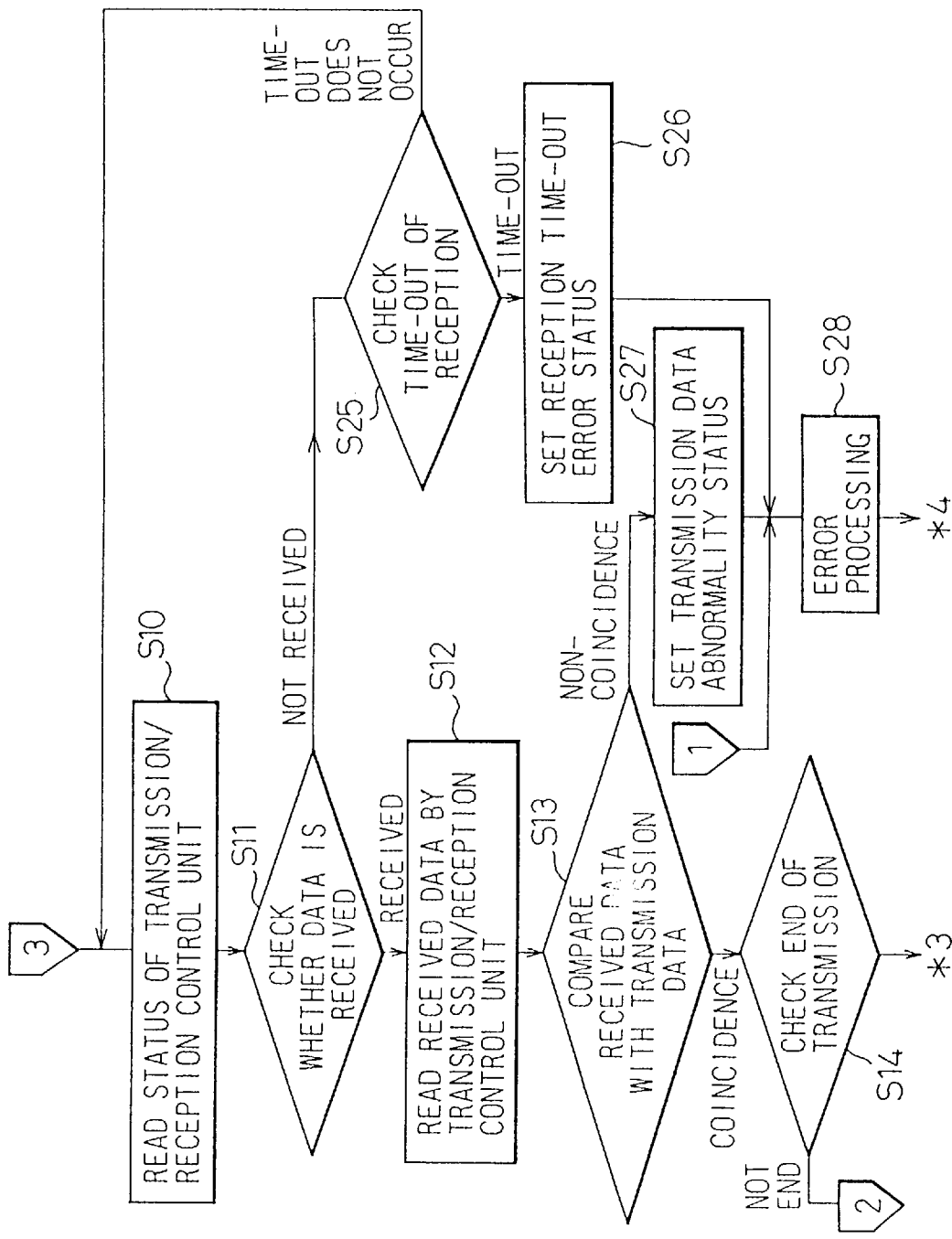
FIG. 14 is a flow chart (part 3) of the execution of a wrap test in the first embodiment.
Figure 15:
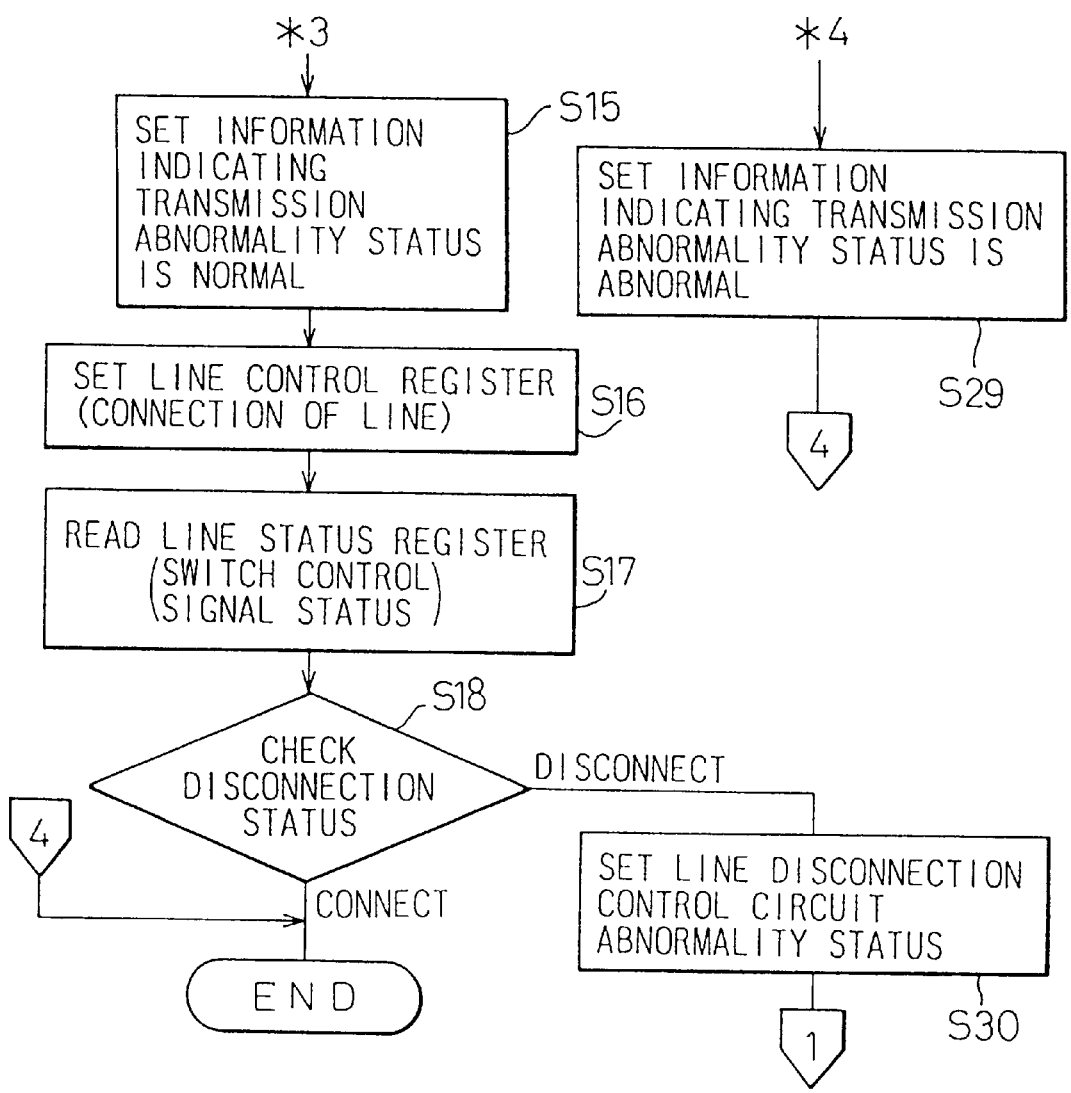
FIG. 15 is a flow chart (part 4) of the execution of a wrap test in the first embodiment.
Figure 16:
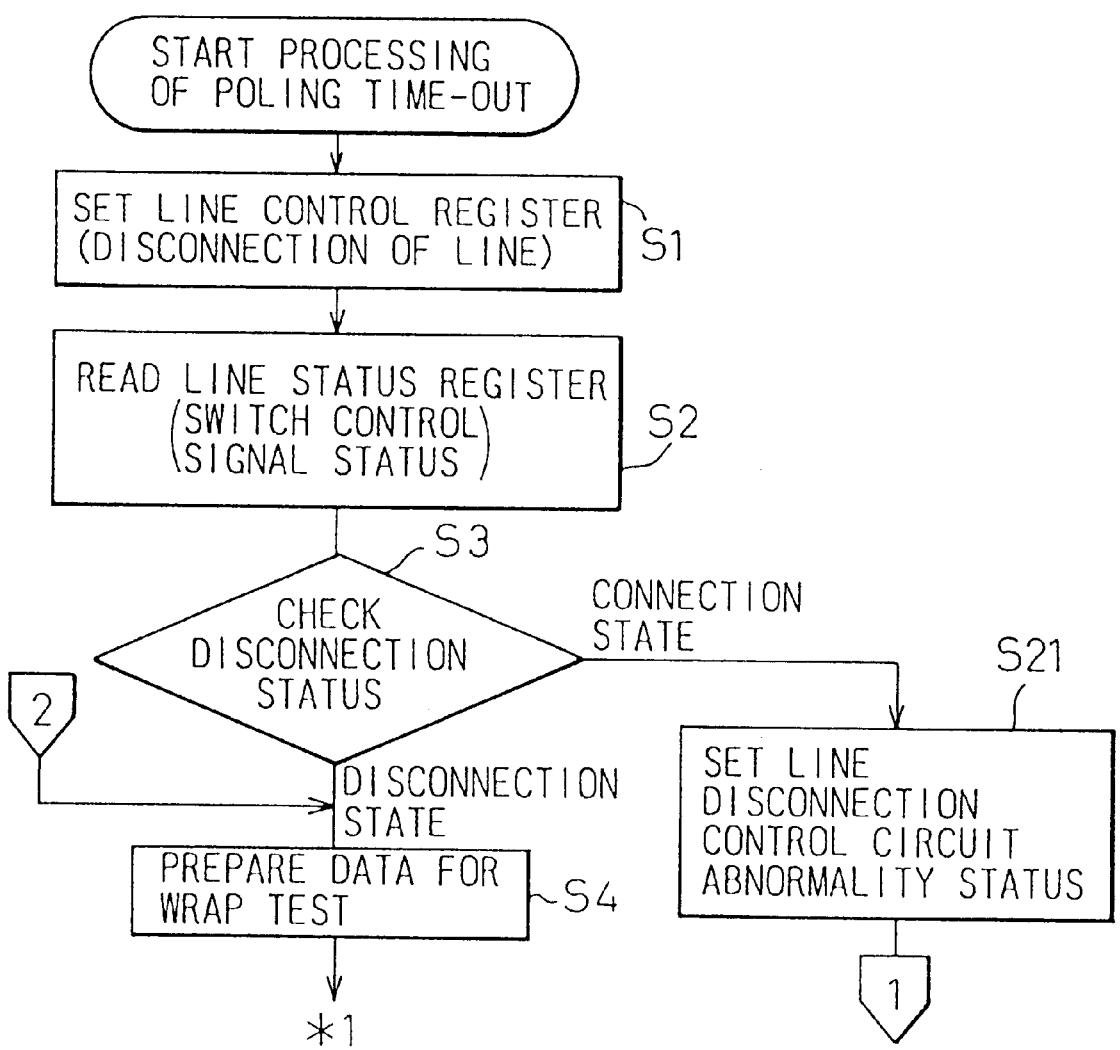
FIG. 16 is a flow chart (part 1) of the operation at the time when a polling time-out occurs at a terminal (FIG. 9)
Figure 17:
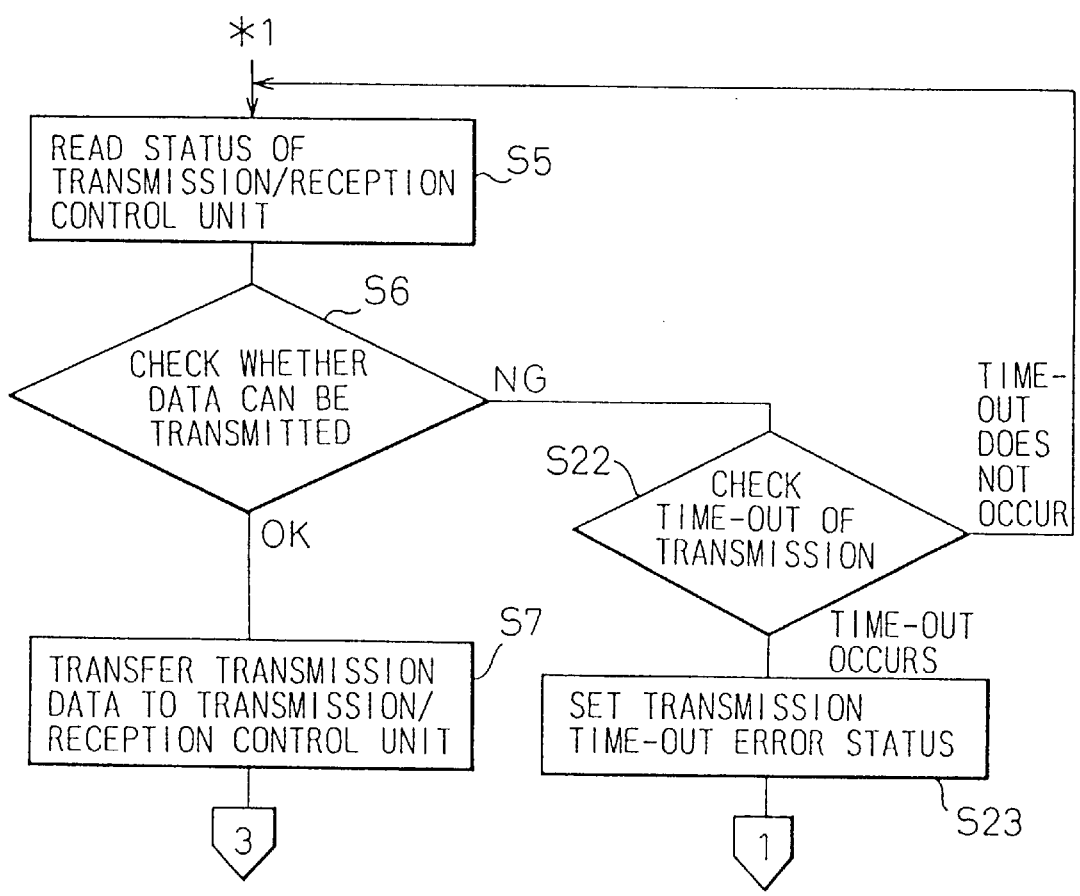
FIG. 17 is a flow chart (part 2) of the operation at the time when a polling time-out occurs at a terminal (FIG. 9)

Next, proceeding to FIG. 14 and FIG. 15, the status of the transmission/reception control unit 5 is read at step S10 and the existence of received data is checked.

When it is determined at step S11 that no data has been received, a check is made as to if the reception time has run out at step S25. When it is determined that the time has not run out, the routine returns to step S10. When it is determined that the time has run out, a reception time-out error status is set at step S6 and the routine proceeds to step S28.

On the other hand, when it is judged at step S11 that there is data received, the central processing unit 4 reads the received data from the transmission/reception control unit 5 at step S12. Next, at step S13, the central processing unit 4 compares the transmission data and the received data read from the transmission/reception control unit 5. When, as a result of the comparison, it is judged that the transmission and received data do not coincide, a transmission data abnormality status is set at step S27, error processing is performed at step S28, and information indicating transmission abnormality status is abnormal is set at step S29.

As opposed to this, when it is determined at step S13 that the transmission and received data coincide, a check is made at step S14 if the transmission of the data has ended.

When performing the wrap test, the amount of the data to be transmitted is fixed in advance, so the central processing unit 4 checks if the amount of the transmission data reaches the set amount of data. If as a result it is determined that the transmission has not yet been ended, the routine returns to step S6. On the other hand, when it is determined that the transmission has ended, the information indicating transmission abnormality status is normal is set at step S15 and a line connection instruction is set in the line control register 25 at step S16. By this, the data transmission apparatus 1 is once again connected to the data transmission line 2.

Next, at step S17, the line control register 25 is read and the status of the switch control signal is checked. If as a result of the check it is determined at step S18 that the status is a disconnect status, a line disconnection control circuit abnormality status is set at step S29 and the routine proceeds to step S28. On the other hand, when it is judged at step S18 that the status is a connection status, the wrap test is ended.

The transmission abnormality status set at step S15 or step S29 is checked at step S10.

In this example, in the case of the wrap test, the coincidence of the transmission and receive data is found by comparison by the central processing unit 4, whereby the reliability of the wrap test is improved. In the configuration of FIG. 2, when transmitting data to the data transmission line 2, the transmission and received data are continuously compared, but in this embodiment, the wrap test is performed and the central processing unit 4 compares the transmission and received data only when there is an interruption by the changing point frequency latch 24 (when a line abnormality is detected). In this case, the frequency of the abnormalities in the interruption by the changing point frequency latch is not high, so even if the central processing unit 4 compares the transmission and received data at the time of the wrap test, the load on the central processing unit does not become great. Note that it is also possible to perform the wrap test by detecting the points of change of the received data.

FIG. 16, FIG. 17, FIG. 18, and FIG. 19 are parts of a flow chart of the operation at the time when a polling time-out occurs at a terminal (FIG. 9). As mentioned earlier, when polling from the host apparatus 1A does not continue for at least a predetermined time due to an abnormality in the data transmission, the terminals 1B to 1E disconnect themselves from the line 2 and perform a wrap test.

When the polling from the host apparatus 1A does not continue for at least a predetermined time, the terminals (1B to 1E) set the line disconnection instruction in the line control register 25 at step S1. Next, at step S2, the line status register 26 is read and the switch control signal status is checked.

When it is determined at step S3 that the switch means 11 is in the connection state, a line disconnection control circuit abnormality status is set at step S21 and the routine proceeds to step S27. On the other hand, when it is determined that the switch means 11 is in the disconnect state, the wrap test data for the wrap test is prepared at step S4.

Next, at step S5, the status of the transmission/reception control unit 5 is read and the possibility of data transmission is checked. When it is determined at step S6 that data transmission is not possible (NG), it is checked at step S22 if the transmission time has run out. When it is determined at step S22 that the time has not run out, the routine returns to step S5. When it is determined that the time has run out, a transmission time-out status is set at step S23 and the routine returns to step S27.

When it is determined at step S6 that data transmission is possible (OK), the transmission data is transferred to the transmission/reception control unit 5 at step S7.

Figure 18:
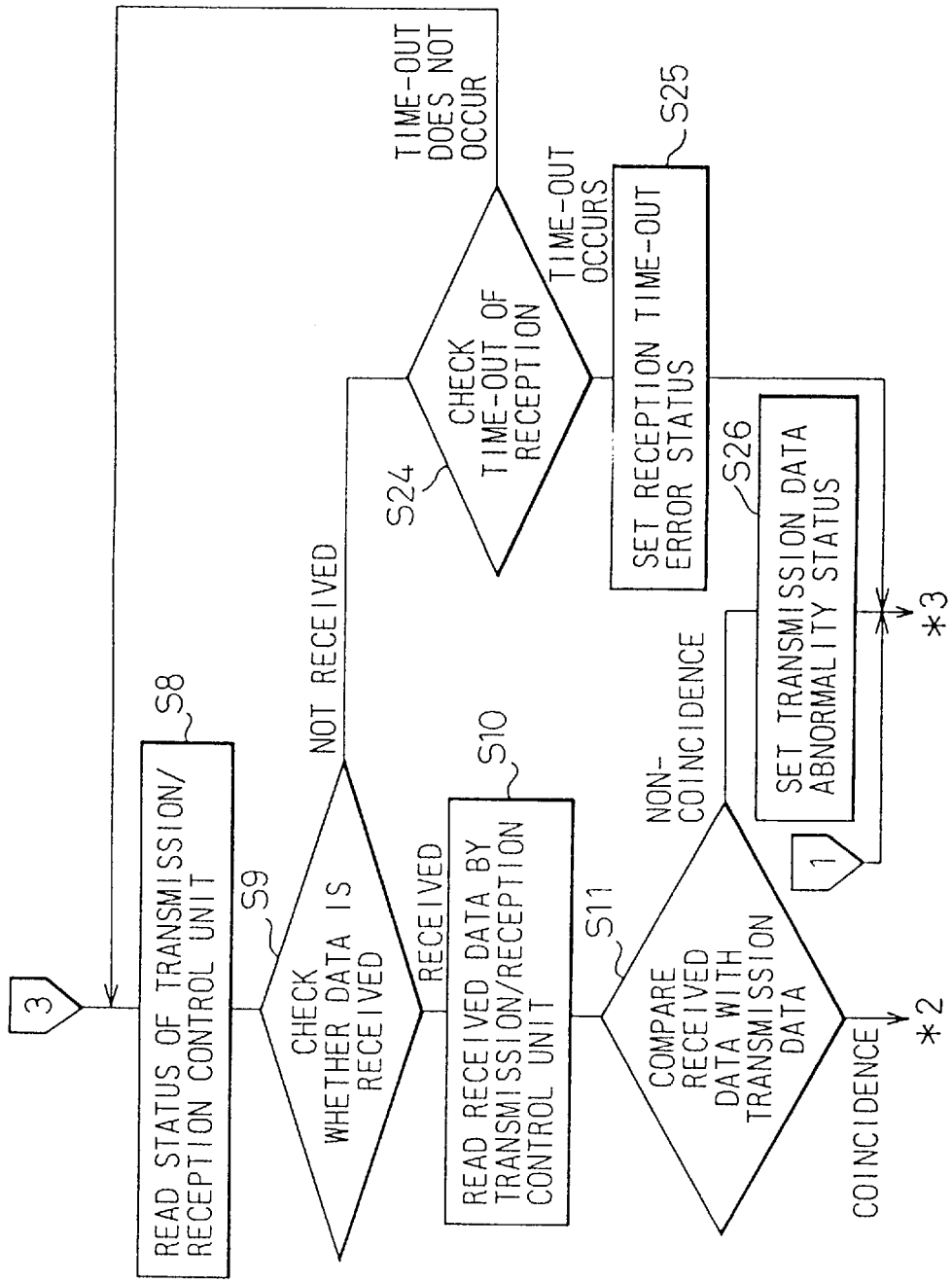
FIG. 18 is a flow chart (part 3) of the operation at the time when a polling time-out occurs at a terminal (FIG. 9)
Figure 19:
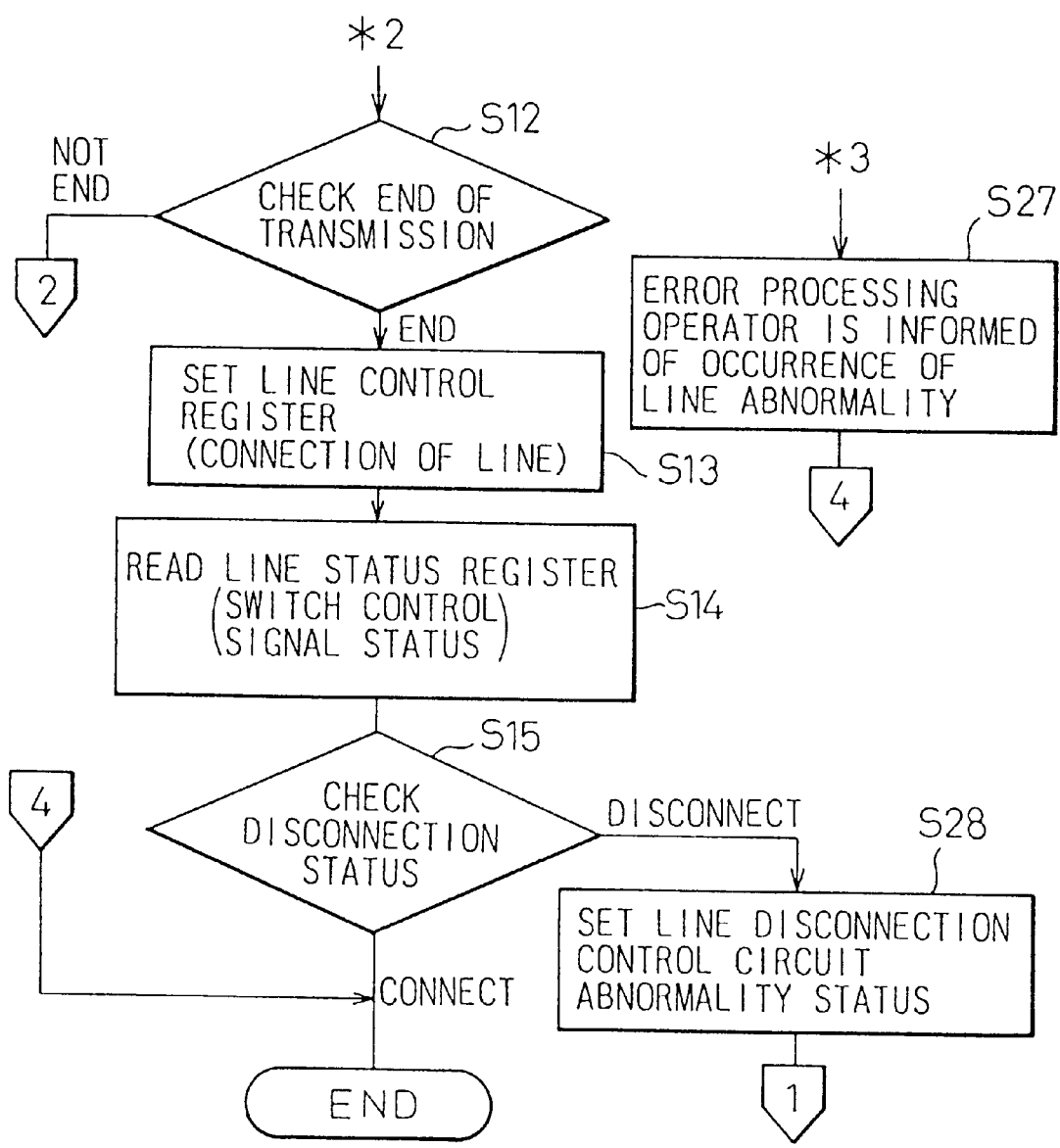
FIG. 19 is a flow chart (part 4) of the operation at the time when a polling time-out occurs at a terminal (FIG. 9)

Proceeding now to FIG. 18 and FIG. 19, the status of the transmission/reception control unit 5 is read at step S8 and the reception of wrapped received data is checked. When it is determined at step S9 that no data has been received, it is checked at step S24 if the reception time has run out. If the time has run out, then a reception time-out error status is set at step S25 and the routine proceeds to step S27.

On the other hand, when it is determined at step S9 that data has been received, the received data is read from the transmission/reception control unit 5 at step S10 and a comparison is made between the transmission data and received data at step S11.

When it is judged at step S11 that the transmission and received data do not coincide, a transmission data abnormality status is set at step S26, error processing is performed at step S27, and the occurrence of a line abnormality is notified to the operator.

On the other hand, when it is judged at step S11 that the transmission and reception data coincide, it is checked at step S12 if the transmission has ended. When the transmission has not yet ended, the routine returns to step S4. When the transmission has ended, a line connection instruction is set in the line control register 25 at step S13. Next, at step S14, the line status register 26 is read and a check is made of the switch control signal status.

When it is determined at step S15 that the status is a disconnect status, a line disconnect control circuit abnormality status is set at step S28 and the routine proceeds to step S27. When it is determined at step S15 that the status is a connect status, the wrap test is ended.

Next, an explanation will be made of a detailed example of the parts in the first embodiment (FIG. 6). First, as the transmission/reception control unit 5 in FIG. 6, it is possible to use the "μPD72001" communication control LSI made by NEC.

Figure 20:
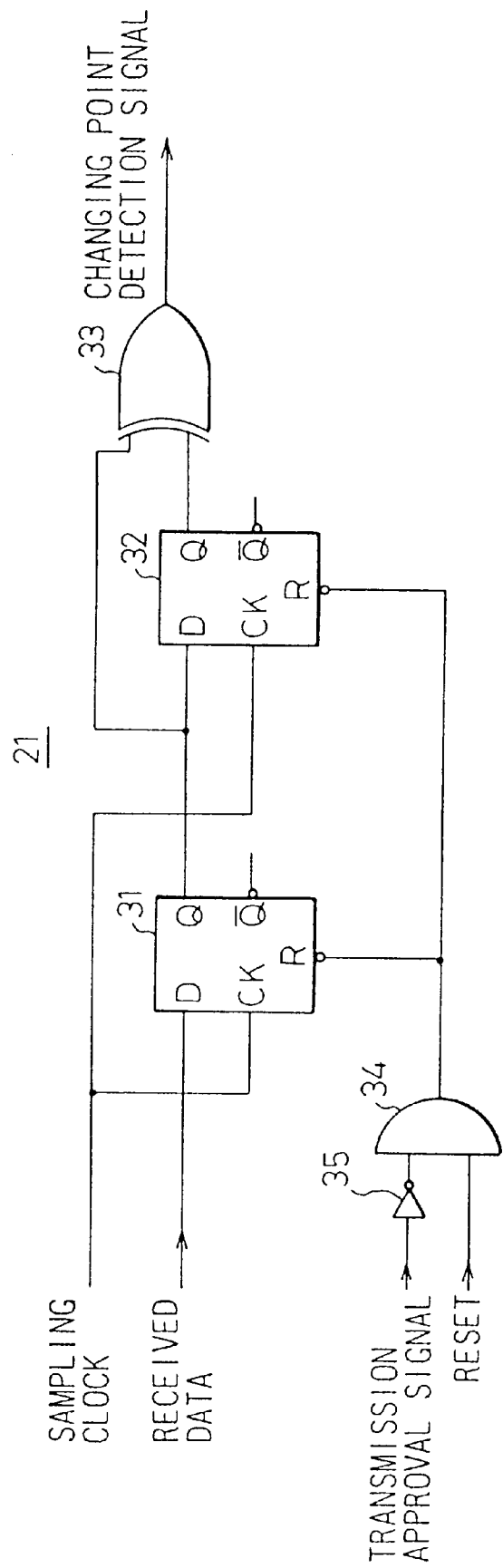
FIG. 20 is a view of a detailed example of a changing point detecting unit 21.

FIG. 20 is a view of a detailed example of a changing point detecting unit 21. In the figure, the parts are as follows: Reference numerals 31 and 32 are flipflops (each corresponding to LS74), 33 is an E-OR gate (corresponding to LS86), 34 is an AND gate (corresponding to LS08), and 35 is a NOT gate (corresponding to LS04). Note that the transmission approval signal indicates the state where transmission is possible by the "L" level and is reset to the "L" level (same below).

Figure 21:
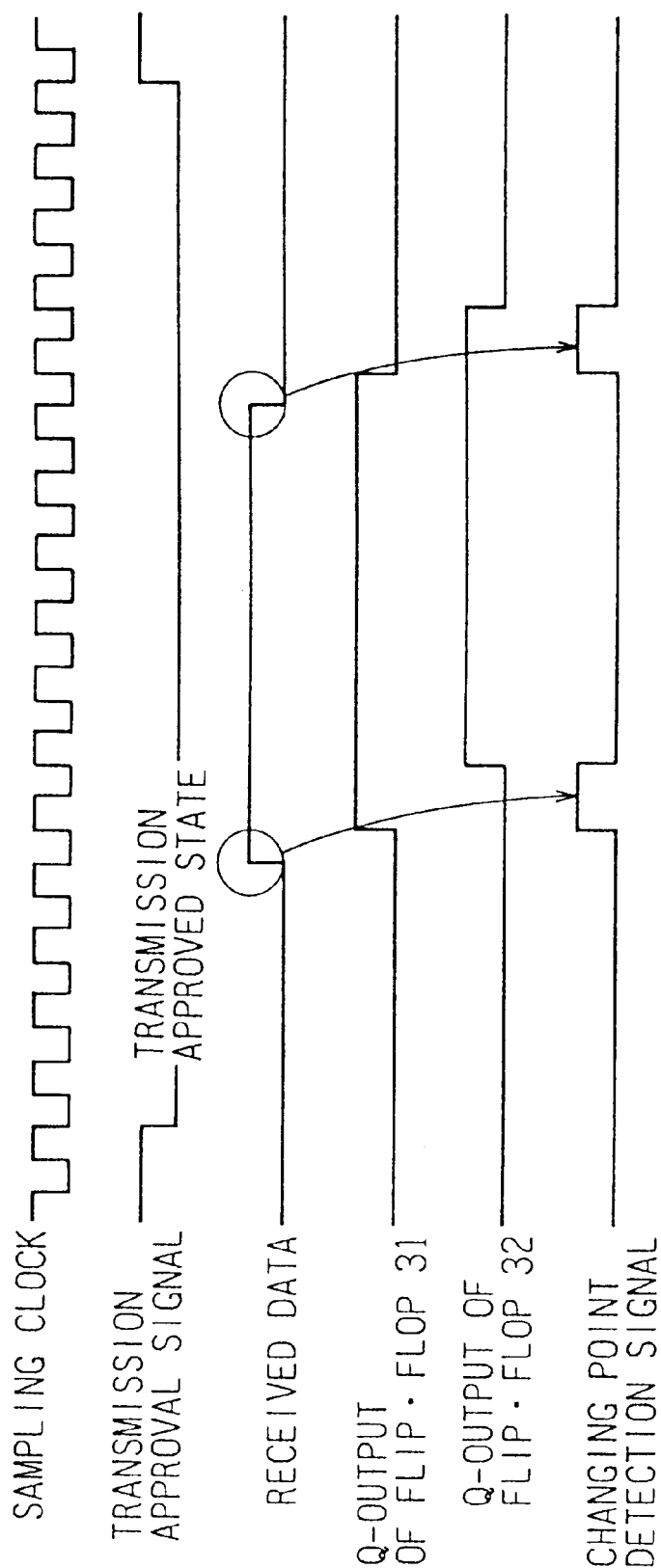
FIG. 21 is a time chart of signal waveforms at key portions of FIG. 20.

FIG. 21 is a time chart of signal waveforms at key portions of FIG. 20. The points of change of the received data, which are the focus of the main operation in the first embodiment, that is, the detection of points of change, are indicated by the circle marks (two locations) in the column on "received data" in the figure. Changing point detection signals shown in the lowest section of the figure are issued corresponding to these points of change.

Figure 22:
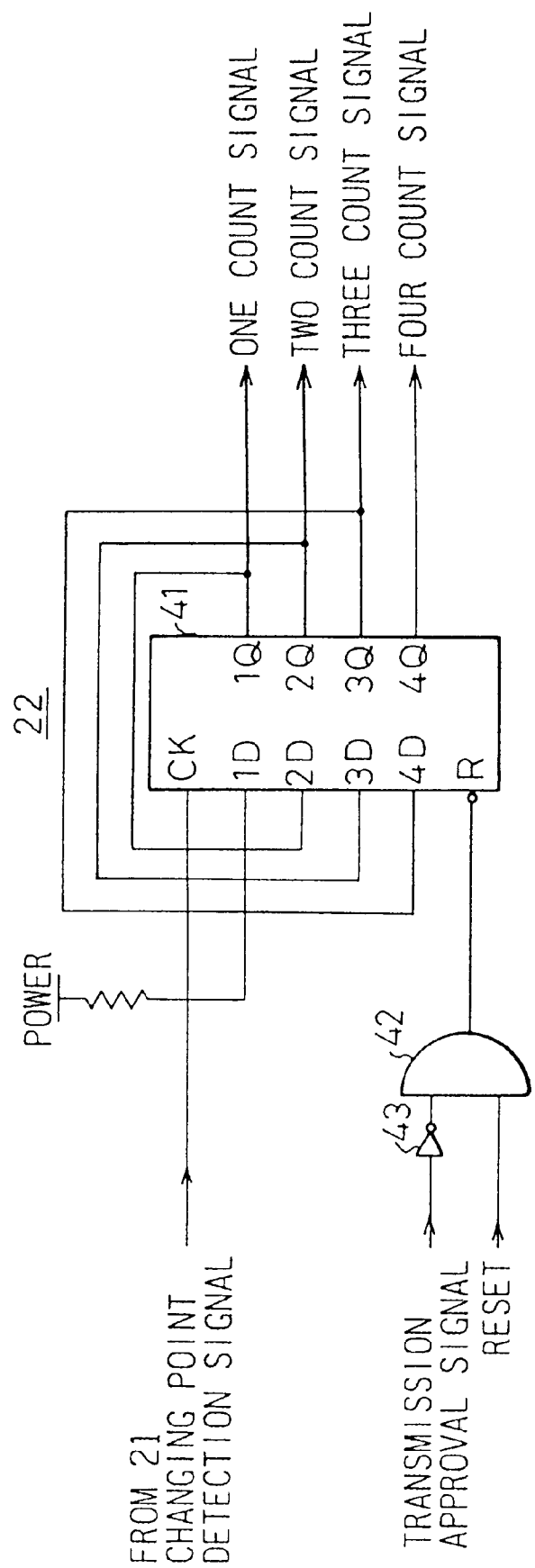
FIG. 22 is a view of a detailed example of a changing point counter 22.

FIG. 22 is a view of a detailed example of a changing point counter 22. In the figure, 41 is a register (corresponding to LS175), 42 is an AND gate (corresponding to LS08), and 43 is a NOT gate (corresponding to LS04). Each time a changing point detection signal shown in the lowest part of FIG. 21 is received, the one count signal, two count signal, . . . successively become the logic "1".

Figure 23:
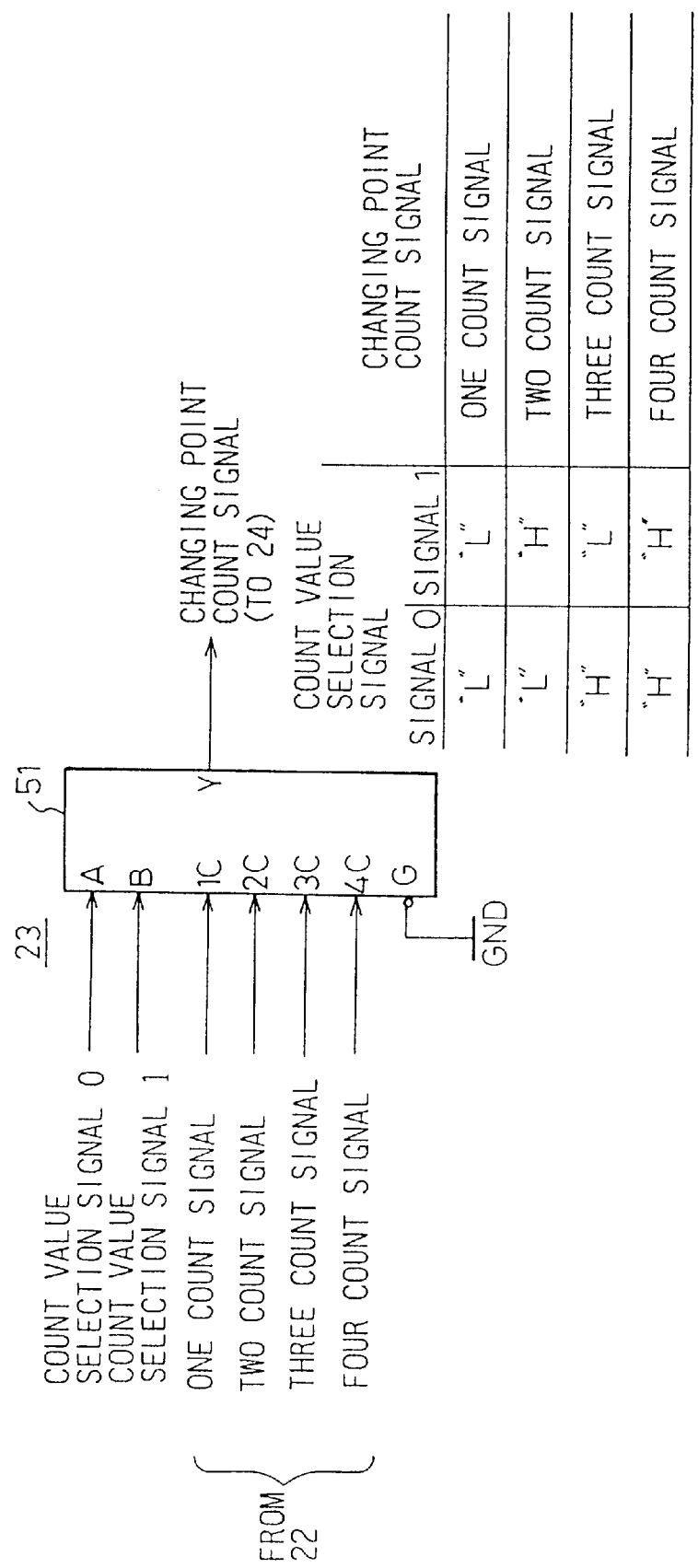
FIG. 23 is a view of a detailed example of a changing point selector 23.

FIG. 23 is a view of a detailed example of a changing point selector 23. In the figure, 51 is a selector (corresponding to LS153), which outputs a changing point count signal to the changing point frequency latch 24 when a count designated in accordance with the logics "L" and "H" (shown in the figure) of the count value selection signals 0 and 1 specified by the central processing unit 4 and one of the one count signal . . . four count signal from the corresponding changing point counter 22 coincide.

Figure 24:
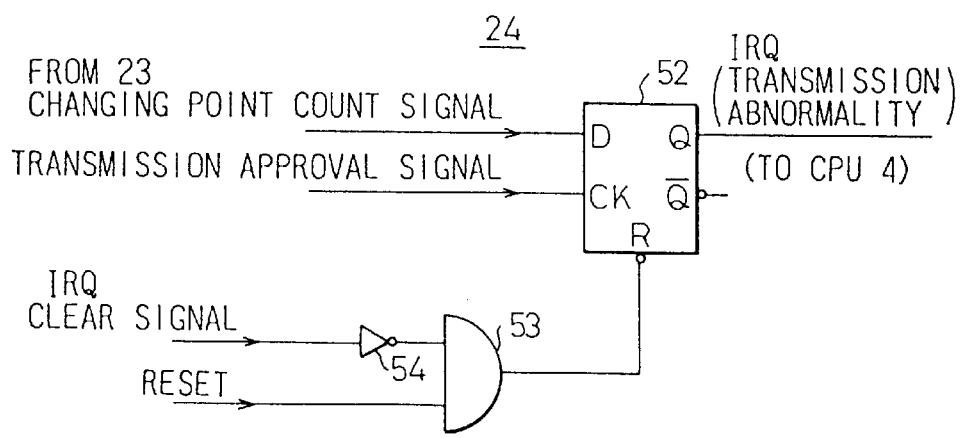
FIG. 24 is a view of a detailed example of a changing point frequency latch 24.

FIG. 24 is a view of a detailed example of a changing point frequency latch 24. In the figure, 52 is a D-flipflop (corresponding to LS74), 53 is an AND gate (corresponding to LS08), and 54 is a NOT gate (corresponding to LS04). If the transmission approval signal indicates that reception is approved ("H") and there is a changing point count signal, this condition is held and used to form the interruption request signal (IRQ) to the central processing unit 4. Note that when the IRQ clear signal becomes the "H" level, the IRQ is cleared.

Figure 25:
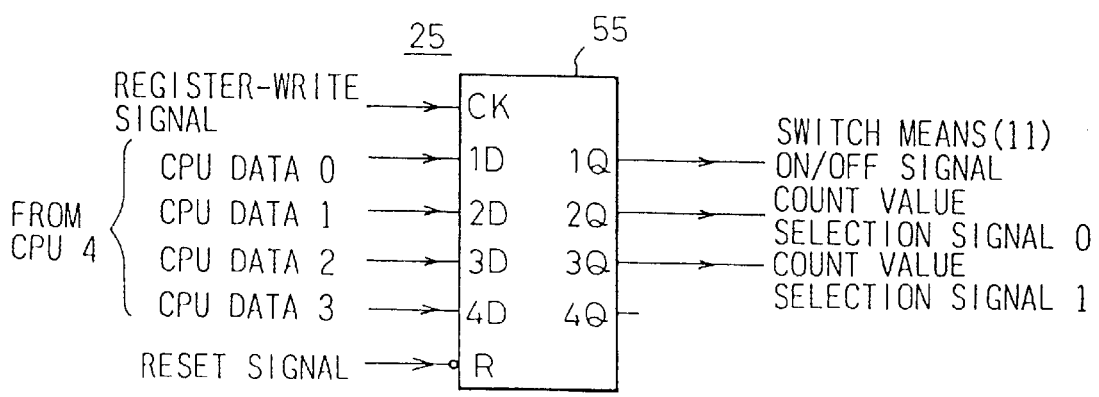
FIG. 25 is a view of a detailed example of a line control register 25.

FIG. 25 is a view of a detailed example of a line control register 25. The line control register 25 may be comprised of a register 55 (corresponding to LS175), as illustrated. This register 55 receives four bits of data from the central processing unit 4 and outputs various signals of the right side of the figure.

Figure 26:
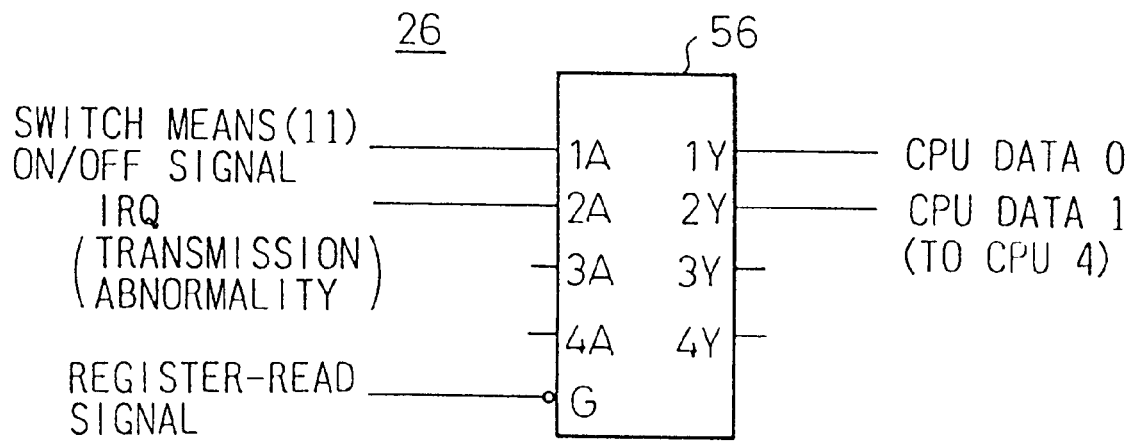
FIG. 26 is a view of a detailed example of a line status register 26.

FIG. 26 is a view of a detailed example of a line status register 26. The line status register 26, as illustrated, may also be comprised of a register 56 (corresponding to LS244), receives as input the various signals at the left side in the figure, and sends these to the central processing unit 4 at the timing of the register-read signal.

Figure 27:
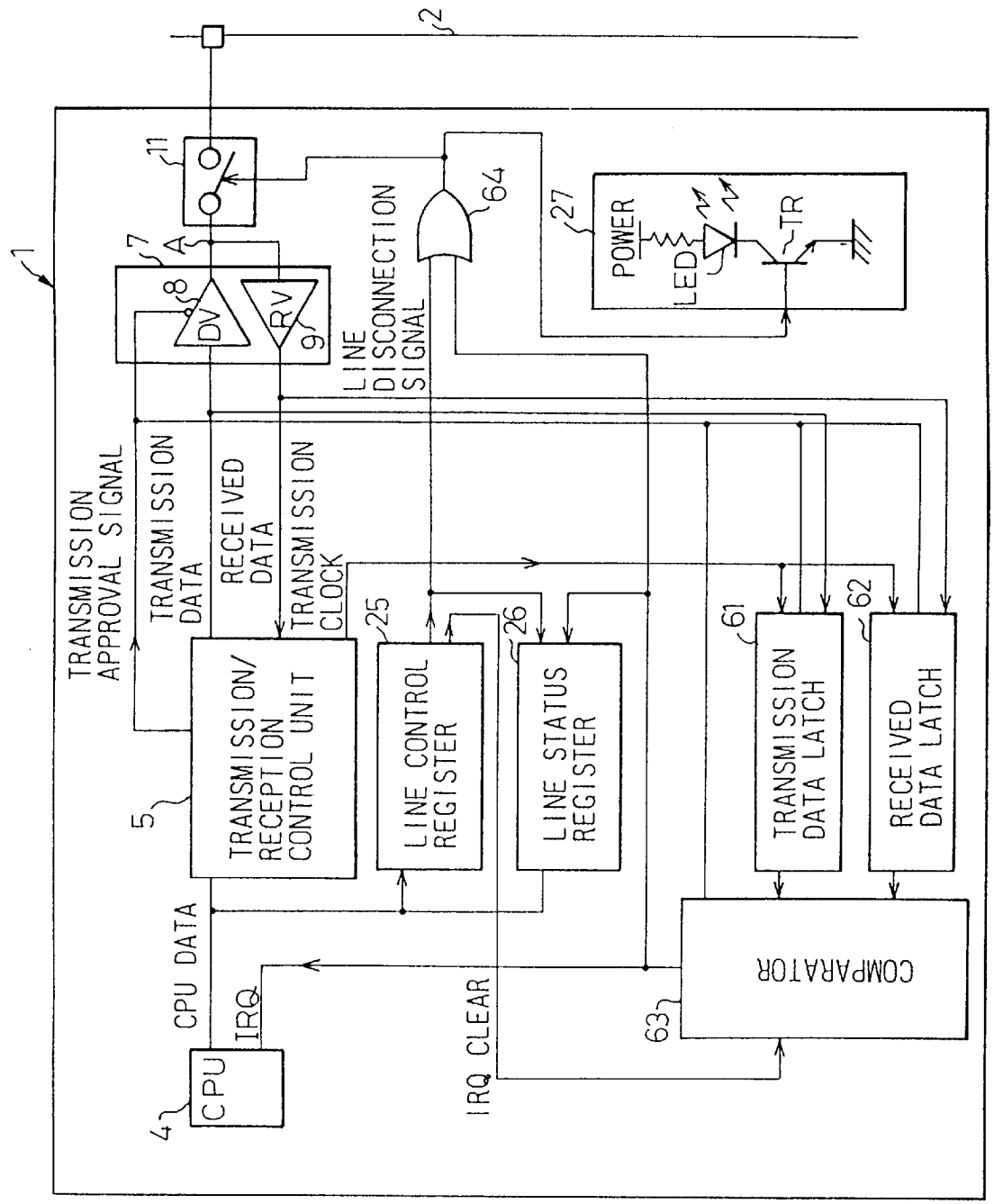
FIG. 27 is a view of a second embodiment of the present invention.

FIG. 27 is a view of a second embodiment of the present invention. Note that explanations will be omitted for portions common with the first embodiment shown in FIG. 6.

In this embodiment, the transmission data output from the transmission/reception control unit 5 is sent to the driver (DV) 8 and input to the transmission data latch 61. The transmission data latch 61 also receives as input the transmission approval signal.

The transmission data output from the driver 8 is wrapped at the point A and input through the receiver (RV) 9 to the received data latch 62. The received data latch 62 also receives as input the transmission approval signal.

The transmission data latch 61 and the received data latch 62 have transmission clocks applied to them from the transmission/reception control unit 5. The transmission operation of the data transmission apparatus 1 is performed in synchronization with the transmission clocks.

The transmission data latch 61 and the received data latch 62 synchronize with the transmission clocks and output their latched transmission data and received data sequentially bit by bit to the comparator 63. The comparator 63 compares the input transmission data and the received data bit by bit. When the result of the comparison is that they do not coincide, an interruption request signal IRQ caused by the data not coinciding is output to the central processing unit 4. The central processing unit 4 determines that an abnormality has occurred in the data transmission based on the interruption request caused by the data not coinciding.

The interruption request signal IRQ caused by the data not coinciding passes through the OR gate 64 and controls to the switch means 11 to automatically disconnect the apparatus from the data transmission line 2.

The input of one side of the OR gate 64 has connected to it the output signal of the line control register 25. By controlling this signal, disconnection of one's own apparatus from the data transmission line 2 is possible under the control of the central processing unit 4.

In the second embodiment too, after an apparatus is disconnected from the data transmission line 2 by the issuance of an interruption request signal (IRQ) caused by the data not coinciding, a wrap test similar to that in the first embodiment is performed so as to specify if the cause of the abnormality lies in the driver 8 of that apparatus or in the driver of another apparatus.

In the second embodiment, provision is made of a comparator 63 which is able to compare the transmission data and the received data in one bit units. Further, automatic disconnection of an apparatus from the data transmission line 2 is possible by an interruption request signal. When a fault occurs, therefore, disconnection of that apparatus from the data transmission line 2 is possible without intervention of the central processing unit 4.

Due to this, it is possible to detect a fault and disconnect the apparatus from the data transmission line 2 in the instant (within a time interval of 1 bit) when a fault occurs in the driver 8.

This is because, in the case of the first embodiment, the system used is to count the number of points of change of the transmission data in the period from when the transmission approval signal turns on to when it turns off, and latch the result of the count using as a trigger the change of the transmission approval signal from on to off, and thereby find the normality or abnormality of the transmission. This enables elimination of the disadvantage that the discovery of a fault is further delayed due to abnormality of transmission being discovered at a point of time different from the occurrence of the fault and due to the count of the number of points of change of the transmission data appearing externally to be normal despite the fact that there is an abnormality in the transmission and reception when a fault in the driver 8 occurs intermittently or a fault occurs in the driver 8 during the transmission.

Further, in the second embodiment, it is possible to use the comparator 63, which performs the comparison of the transmission data and the received data in units of bits, to compare the transmission and received data at the time of the wrap test.

As opposed to this, in the case of the first embodiment, just the number of the points of change of the transmission and received data is counted, so when a fault of the driver 8 occurs intermittently or the driver 8 breaks down in the middle of the wrap test, the count of the number of points of change of the transmission and received data will sometimes appear normal at first glance despite there being an abnormality in the transmission and reception. Accordingly, the comparison of the transmission and received data at the time of a wrap test must be performed by the central processing unit 4.

Figure 28:
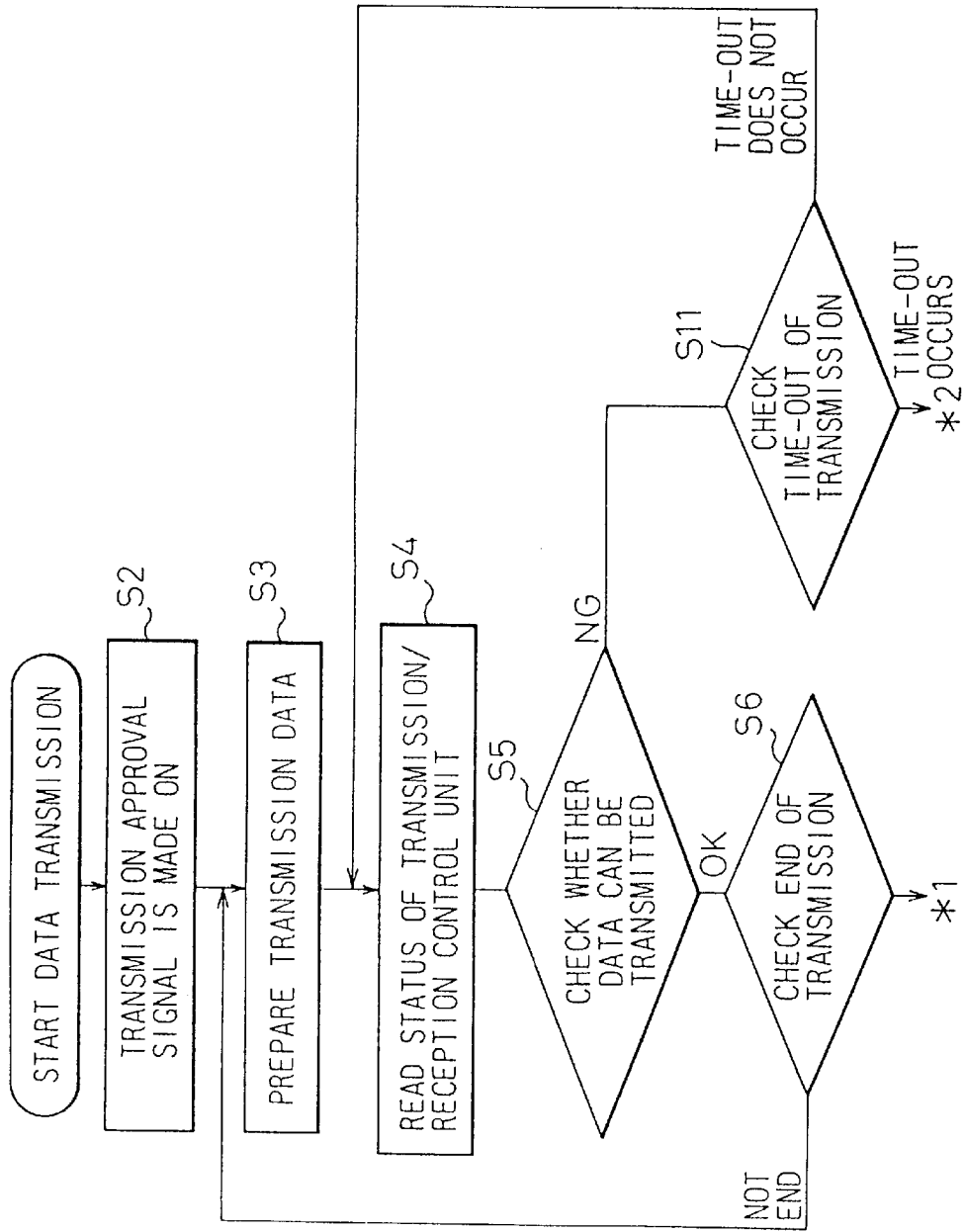
FIG. 28 is a flow chart (part 1) of a data transmission procedure in the second embodiment.
Figure 29:
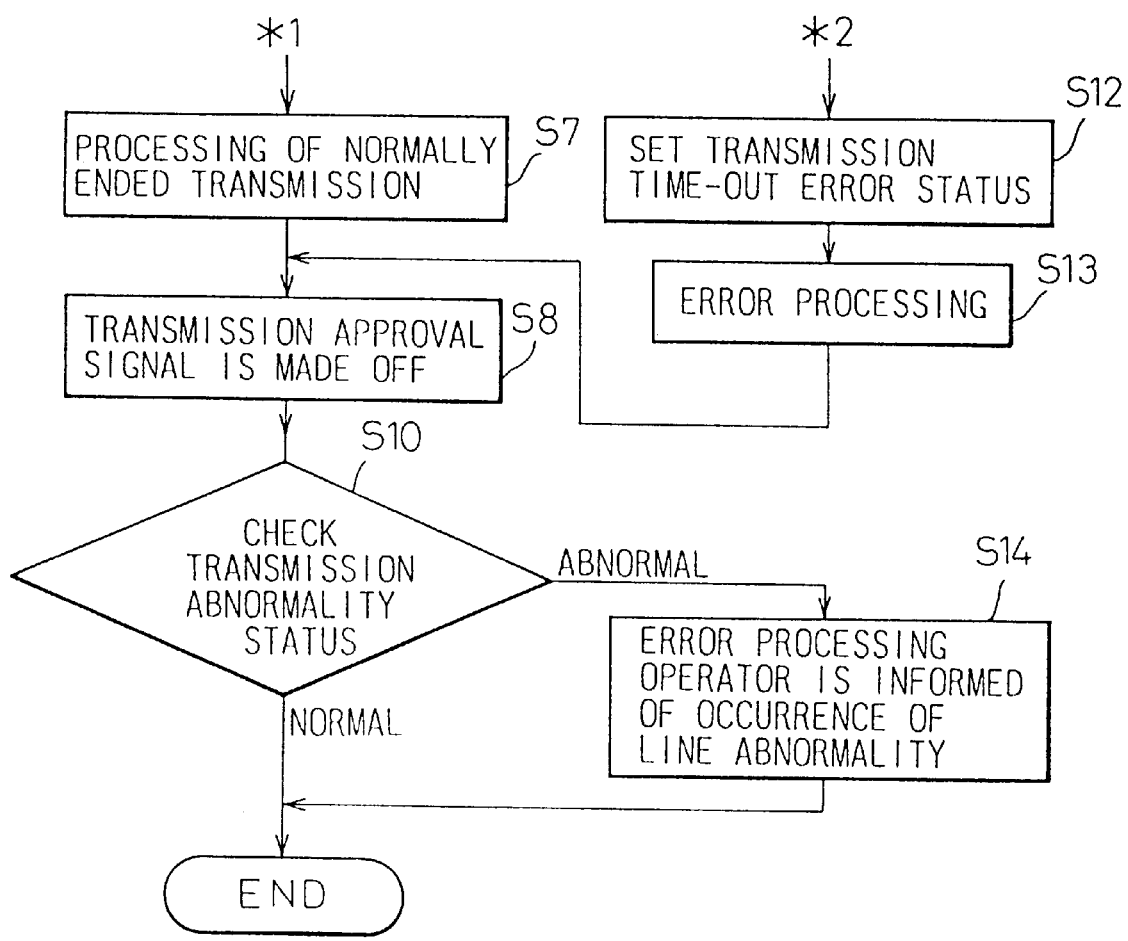
FIG. 29 is a flow chart (part 2) of a data transmission procedure in the second embodiment.

Due to this, in the second embodiment, for the same wrap test as in the first embodiment, it is possible to perform the comparison of the transmission and received data at the time of the wrap test by the comparator 63, which in the first embodiment had to be performed by the central processing unit 4. Due to this, the control program for the comparison becomes unnecessary and the load on the central processing unit 4 can be reduced. Further, in the second embodiment, it is possible to automatically peform the disconnection of an apparatus from the data transmission line 2 without the intervention of the central processing unit 4 at the time of occurrence of an interruption, unlike in the first embodiment where intervention of the central processing unit 4 was necessary. Accordingly, the load on the central processing unit 4 can be lightened in this regard as well FIG. 28 and FIG. 29 are parts of a flow chart of a data transmission procedure in the second embodiment. These correspond to FIG. 10 and FIG. 11 in the first embodiment. Note that the same step number is given to steps the same as in the first embodiment. Steps peculiar to the second embodiment are given numbers with apostropes after them (S1', S2' . . . etc.) The same follows. Further, in FIG. 28, there are no steps S1 and S9 as in FIG. 10 and FIG. 11.

FIG. 30, FIG. 31, FIG. 32, and FIG. 33 are parts of a flow chart of the execution of a wrap test in the second embodiment. They correspond to FIG. 12 to FIG. 15 in the first embodiment.

Figure 30:
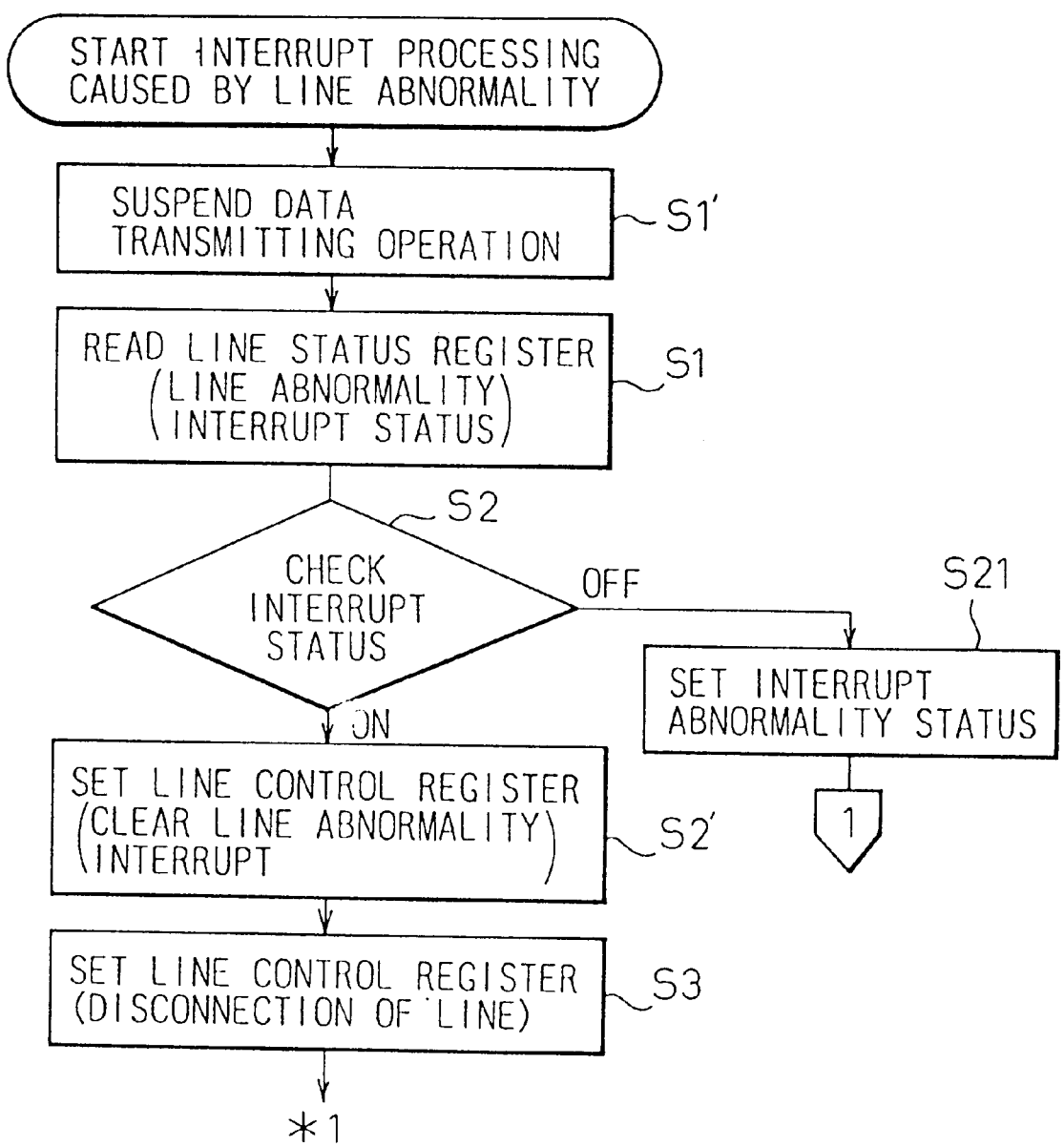
FIG. 30 is a flow chart (part 1) of the execution of a wrap test in the second embodiment.
Figure 31:
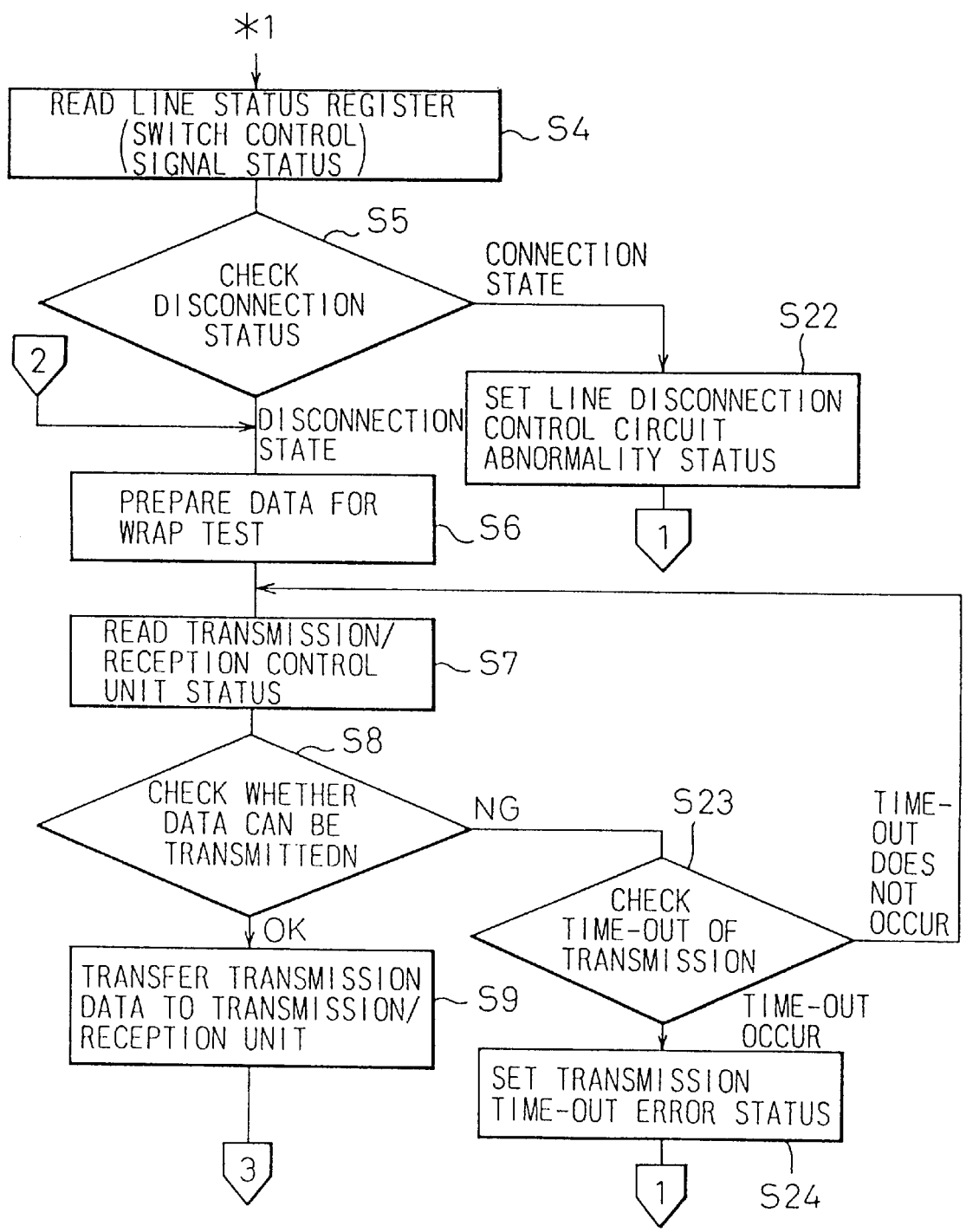
FIG. 31 is a flow chart (part 2) of the execution of a wrap test in the second embodiment.

In the second embodiment, when the comparator 63 finds noncoincidence between the transmission data and the received data, an interruption request (IRQ) is immediately issued and the switch means 11 opens, so the data transmission operation is suspended (step S1' in FIG. 30). Further, at step S2', the comparator 63 which continues to output the IRQ is reset.

Figure 32:
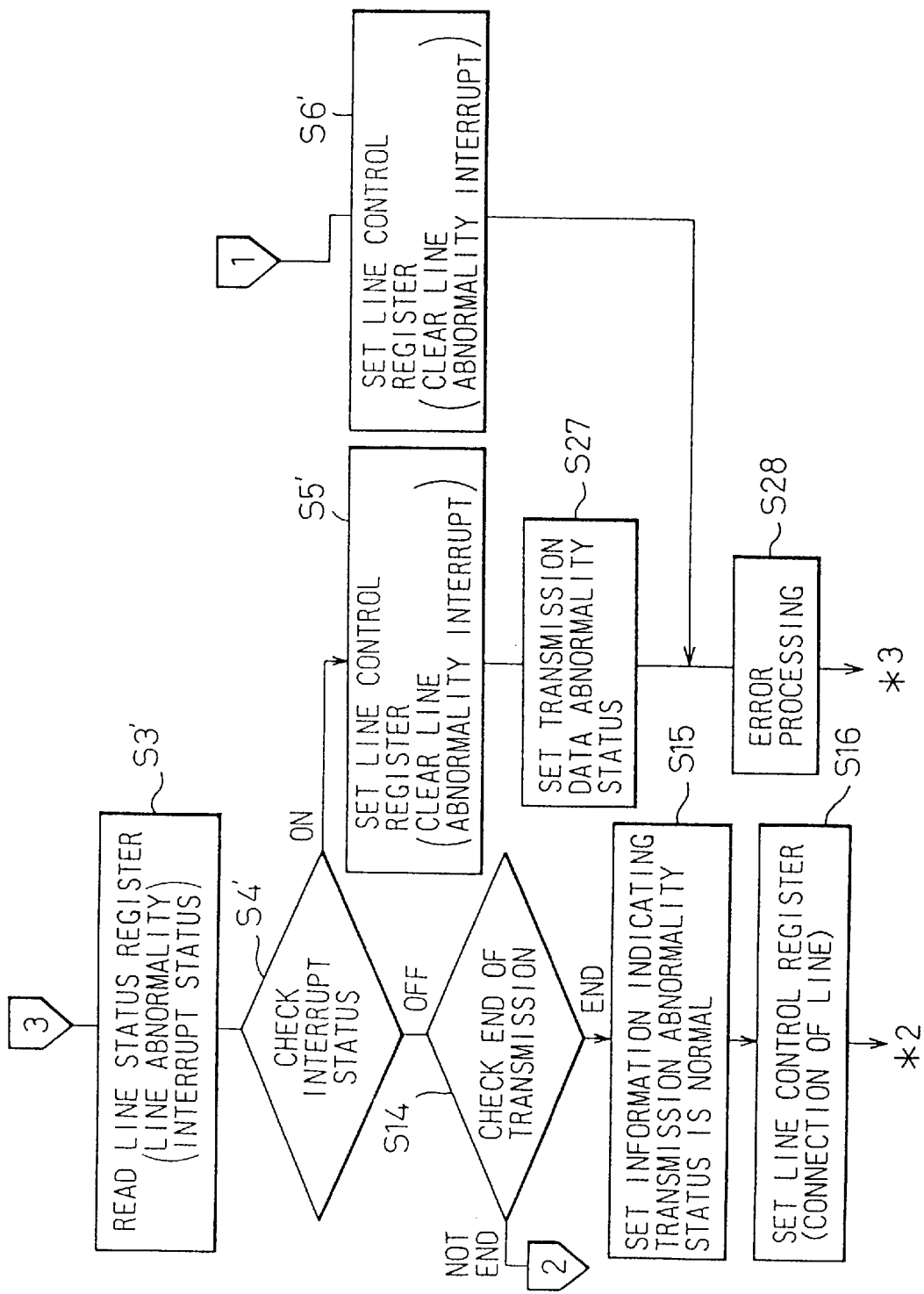
FIG. 32 is a flow chart (part 3) of the execution of a wrap test in the second embodiment.
Figure 33:
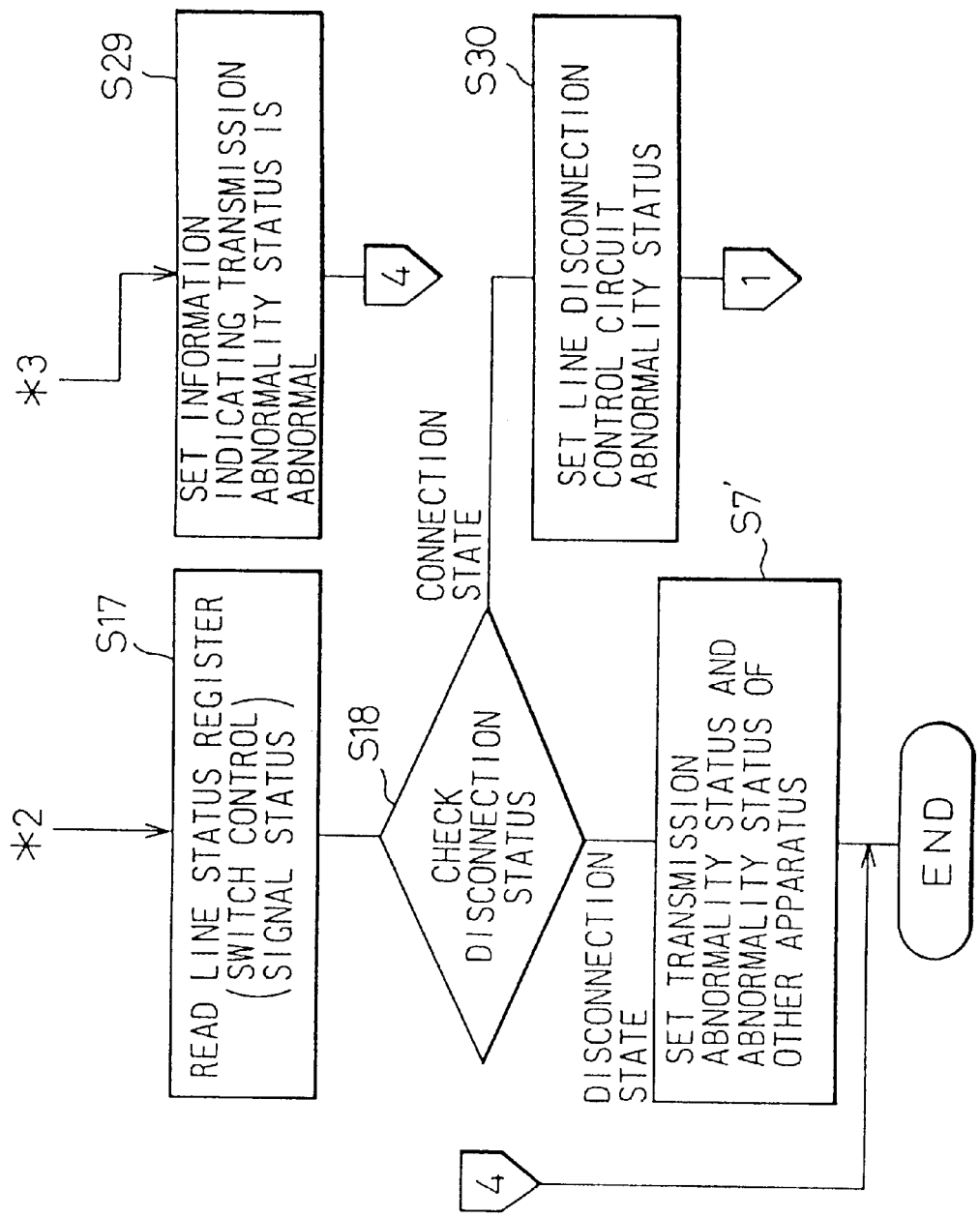
FIG. 33 is a flow chart (part 4) of the execution of a wrap test in the second embodiment.
Figure 34:
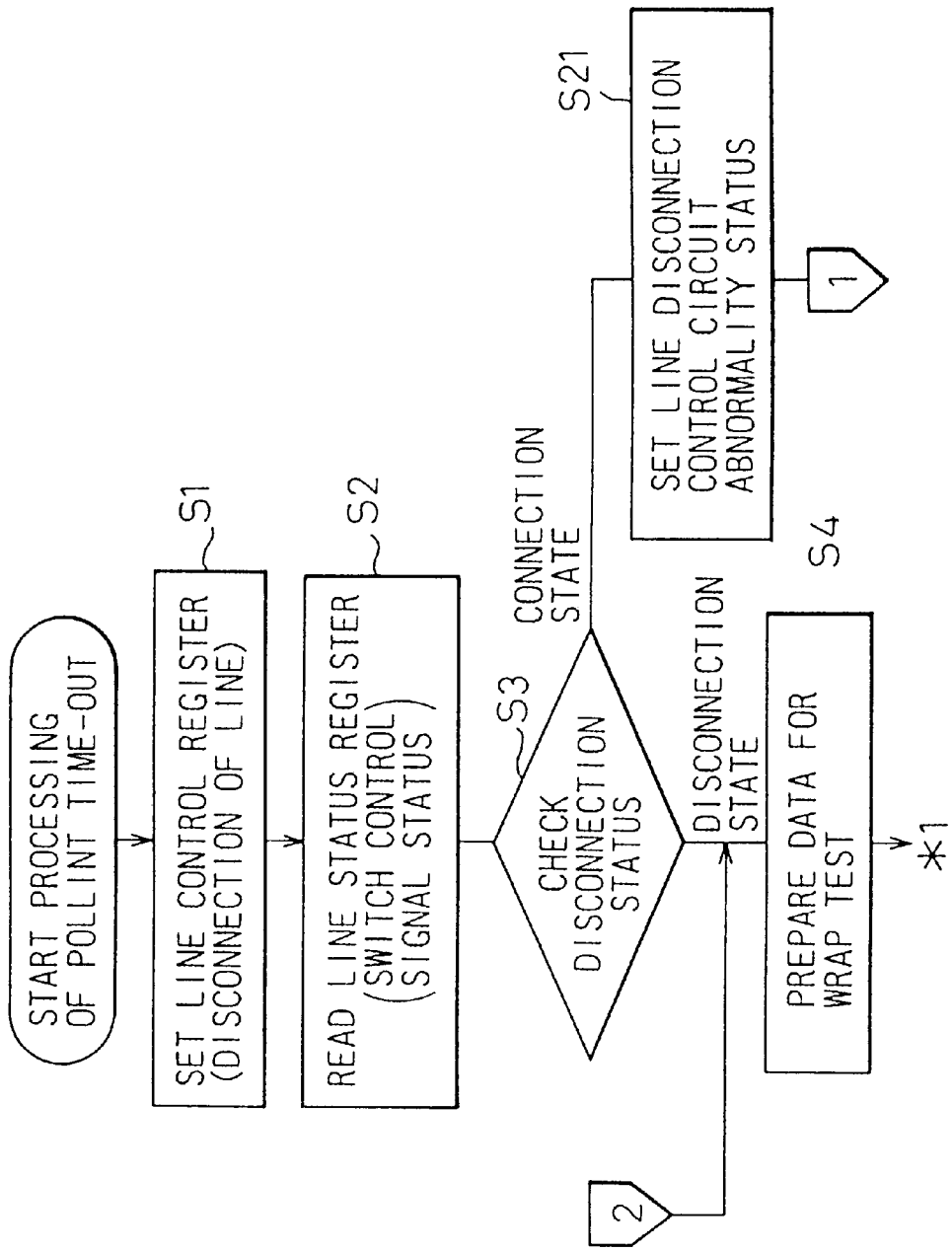
FIG. 34 is a flow chart (part 1) of the operation at the time when a polling time-out occurs at a terminal (FIG. 9)
Figure 35:
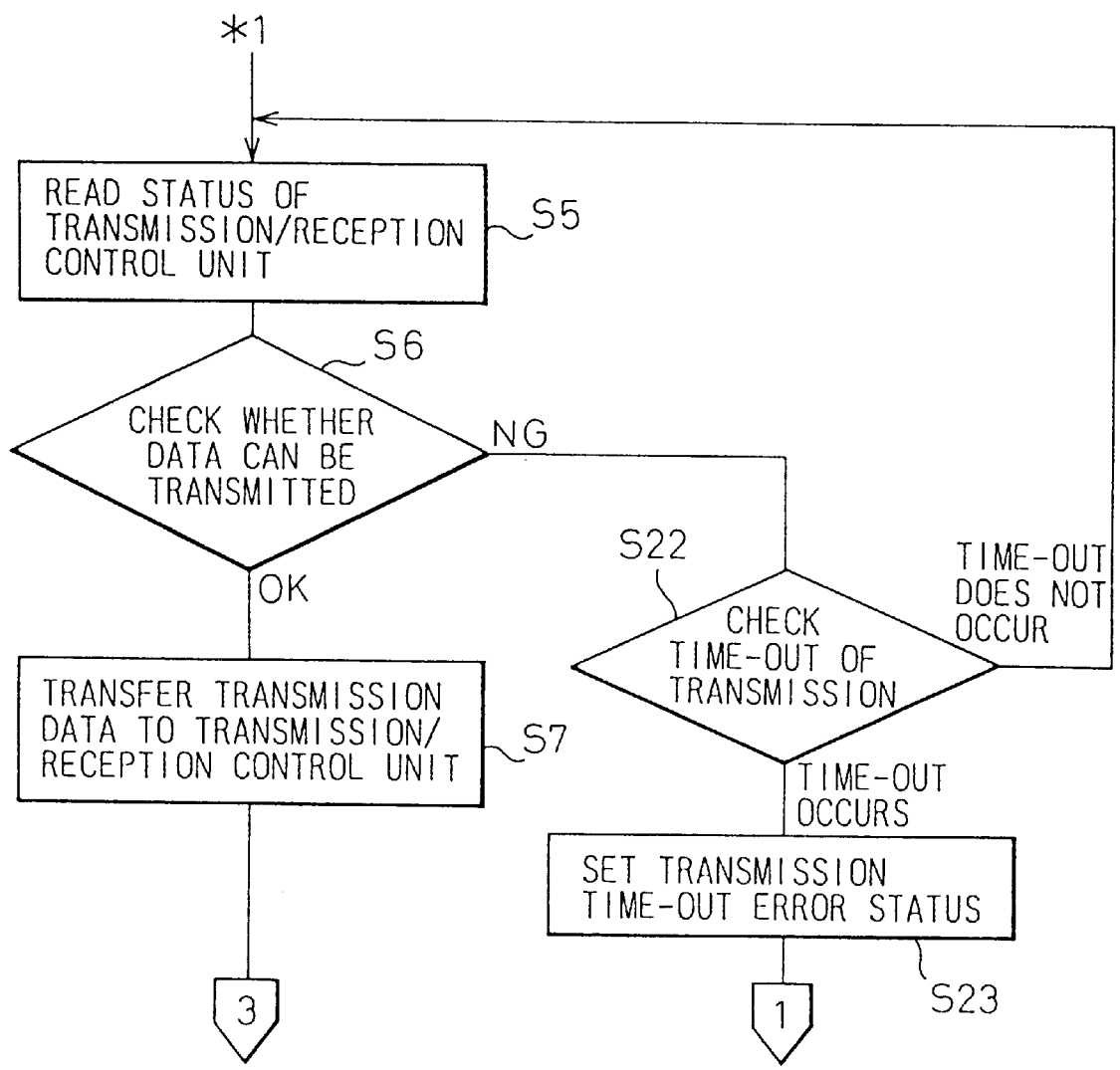
FIG. 35 is a flow chart (part 2) of the operation at the time when a polling time-out occurs at a terminal (FIG. 9)
Figure 36:
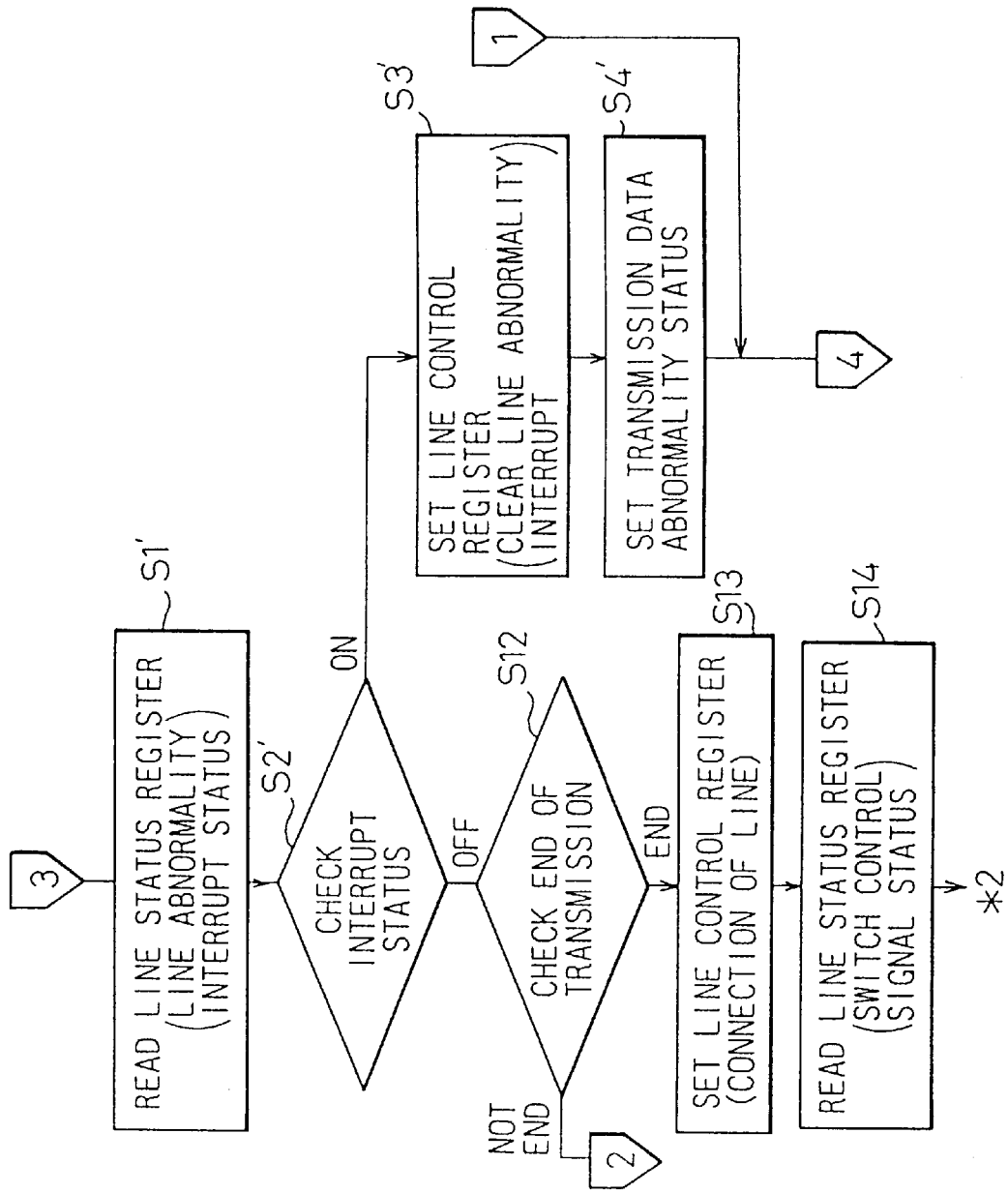
FIG. 36 is a flow chart (part 3) of the operation at the time when a polling time-out occurs at a terminal (FIG. 9)
Figure 37:
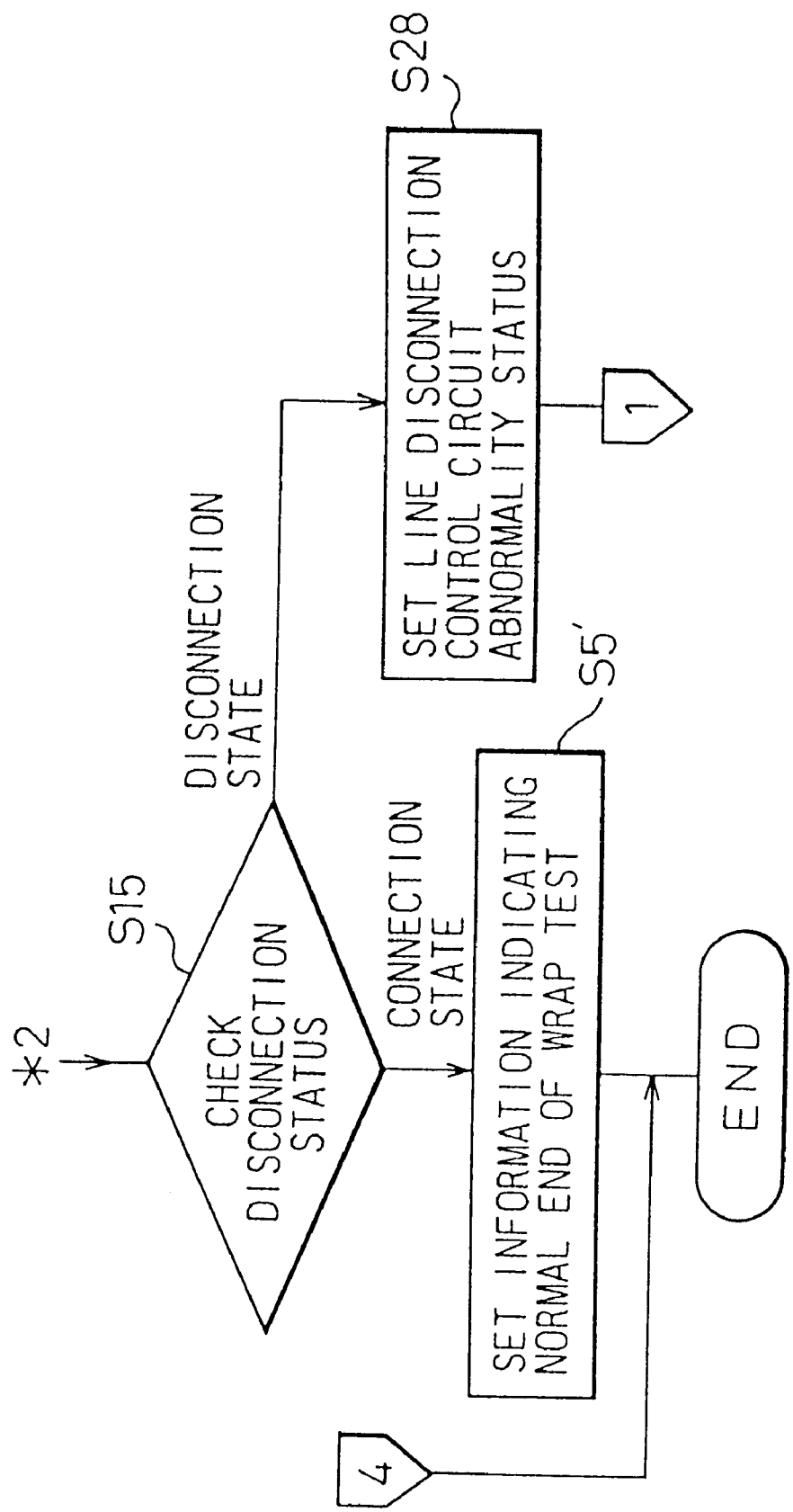
FIG. 37 is a flow chart (part 4) of the operation at the time when a polling time-out occurs at a terminal (FIG. 9)

At steps S3' and S4' of FIG. 32, the interruption status is checked and when there is an interruption, this is cleared (step S5').

FIG. 34, FIG. 35, FIG. 36, and FIG. 37 are parts of a flow chart of the operation at the time when a polling time-out occurs at a terminal (FIG. 9). These correspond to FIG. 16 to FIG. 19 in the first embodiment. At steps S1', S2', and S3' of FIG. 36, the interruption status is checked and if an interruption status is indicated, this is cleared.

Figure 38:
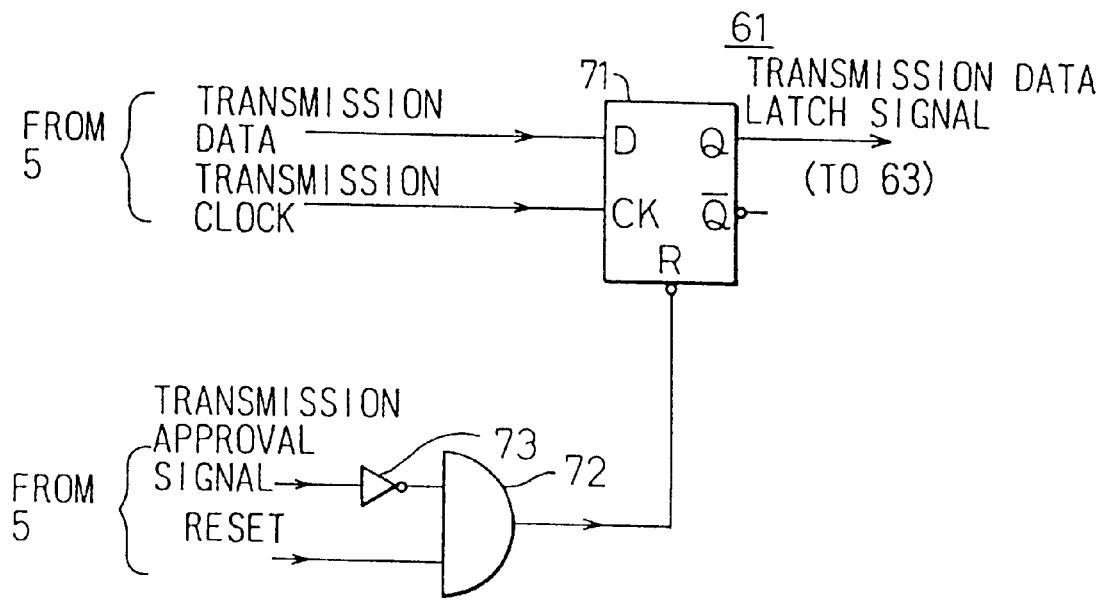
FIG. 38 is a view of a detailed example of a transmission data latch 61.

FIG. 38 is a view of a detailed example of a transmission data latch 61. In the figure, 71 is a D-flipflop (corresponding to LS74), 72 is an AND gate (corresponding to LS08), and 73 is a NOT gate (corresponding to LS04).

Figure 39:
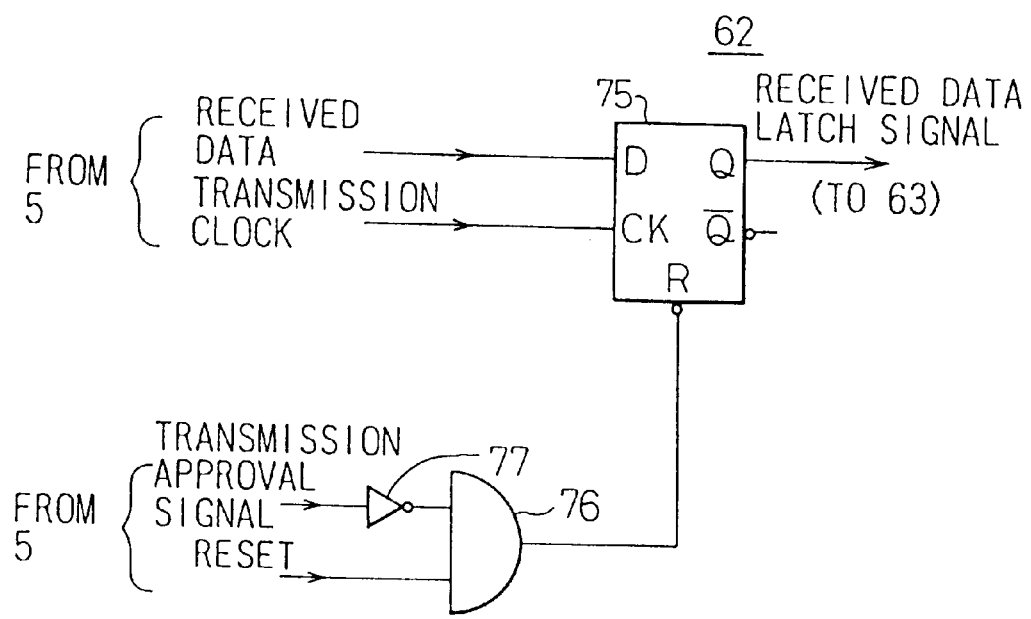
FIG. 39 is a view of a detailed example of a received data latch 62.

FIG. 39 is a view of a detailed example of a received data latch 62. Reference numerals 75, 76, and 88 in the figure indicate similar members as 71, 72, and 73 in FIG. 38.

Figure 40:
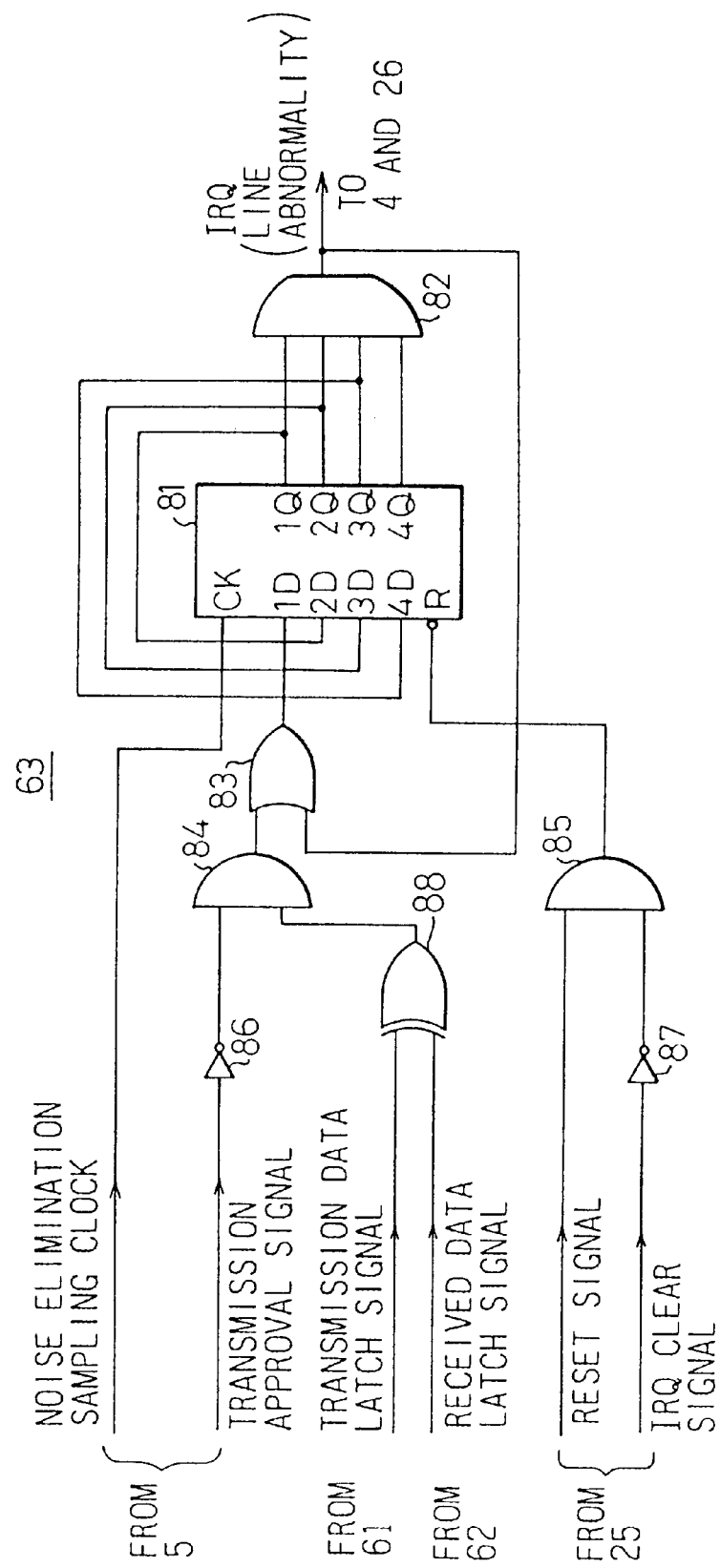
FIG. 40 is a view of a detailed example of a comparator 63.

FIG. 40 is a view of a detailed example of a comparator 63. In the figure, the parts are as follows: Reference numeral

81 is a register (corresponding to LS175), 82 is an AND gate (corresponding to LS21), 83 is an OR gate (corresponding to LS32), 84 and 85 are AND gates (corresponding to LS08), 86 and 87 are NOT gates (corresponding to LS04), and 88 is an E-OR gate (corresponding to LS86). Note that when the IRG clear signal is the "H" level, the IRQ is cleared.

Figure 41:
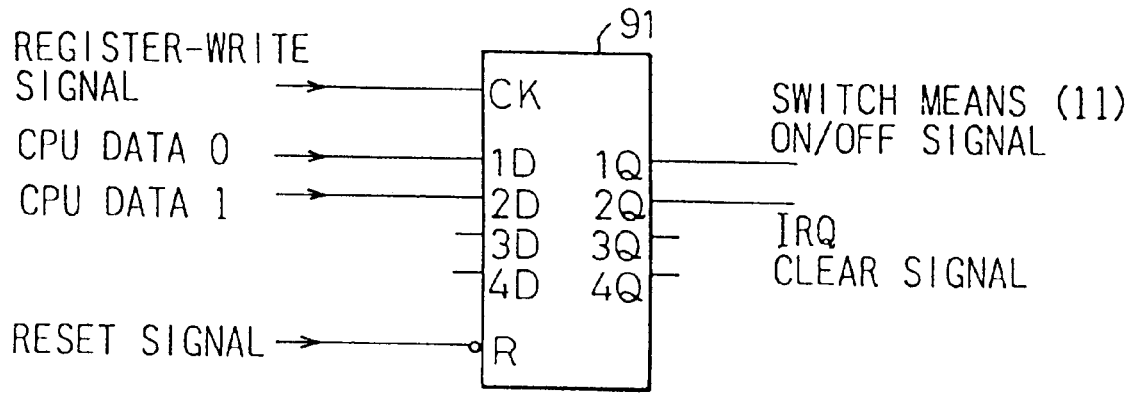
FIG. 41 is a view of a detailed example of a line control register 25 in the second embodiment.

FIG. 41 is a view of a detailed example of a line control register 25 in the second embodiment. The line control register 25, as illustrated, is comprised of the register 91 (corresponding to LS175).

Figure 42:
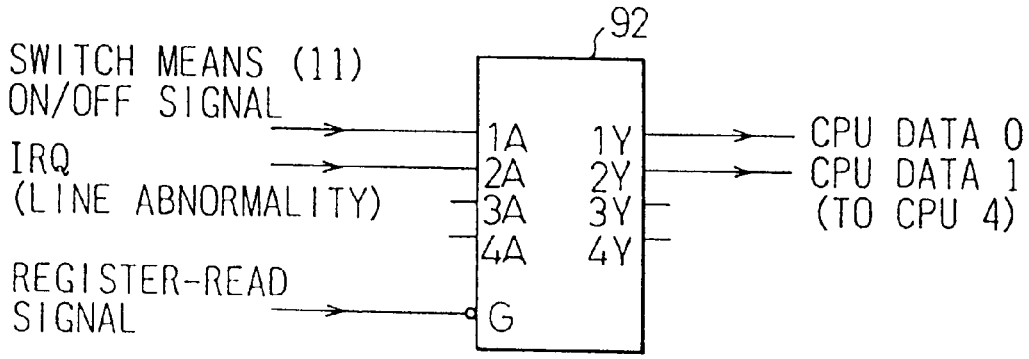
FIG. 42 is a view of a detailed example of a line status register 26 in the second embodiment.

FIG. 42 is a view of a detailed example of a line status register 26 in the second embodiment. The line status register 26 also, as is illustrated, is comprised of a register 92 (corresponding to LS244) and is exactly the same in configuration as the first embodiment.

The first and second embodiments mentioned above were explained with reference to an example of a data transmission line of a half duplex communication system, but these embodiments may also be applied to the case of use of a data transmission line of the full duplex communication system.

FIG. 43 is a view of a the configuration for realization of the configuration of FIG. 5 using a data transmission line under a full duplex communication system. In data transmission by a full duplex communication system, the transmission and reception of data are performed in parallel, so a receiver 9' for wrapping and receiving transmission data is added separately from the receiver 9 for the received data. The rest of the configuration and operation are exactly the same as the configuration shown in FIG. 5.

In conclusion, looking at the effects of the invention, according to the first aspect of the invention, introduction of the data abnormality monitoring means releases the central processing unit from the compulsory execution of a complicated control program and therefore lightens the load on the central processing unit enabling its capacity to be used for increasing the speed of other processing.

According to the second aspect of the invention, it is possible to simplify the invention by just selecting a particular bit pattern for the existing start flag and stop flag.

According to the third aspect of the invention, the abnormalities of data can be monitored by the simple method of detecting the point of change of the logic "1" and "0".

According to the fourth aspect of the invention, it is possible to flexibly cope with the noise environment in which the computer system is placed.

According to the fifth aspect of the invention, it is possible to monitor abnormalities in data by a simple operation of comparison of the data.

According to the sixth aspect of the invention, abnormalities in the data can be monitored at an extremely fast speed.

According to the seventh aspect of the invention, use of a switch means enables prompt and automatic disconnection of a data transmission apparatus from the computer system or reincorporation of the apparatus in the system.

According to the eighth aspect of the invention, the complete isolation of the faulty apparatus is used to enable self-diagnosis.

According to the ninth aspect of the invention, aa data transmission apparatus which achieves the objects simply and inexpensively is realized.

According to the 10th aspect of the invention, introduction of a changing point detecting unit for the received data enables the abnormalities in the data to be monitored.

According to the 11th aspect of the invention, hardware is realized for enabling the noise environment in which the computer system is placed to be flexibly coped with.

According to the 12th aspect of the invention, abnormalities can be detected promptly and with a high precision.

According to the 13th aspect of the invention, the transmission/received data is compared bit by bit, so even higher precision and faster detection of abnormalities becomes possible.

According to the 14th aspect of the invention, the data transmission apparatus can be automatically disconnected from and reconnected to the data transmission line and according human intervention is not necessary.

According to the 15th aspect of the invention, the data transmission apparatus is completely disconnected from other data transmission apparatuses, so self-diagnosis of faults is possible.

I claim:

1. A computer system having a facility for detection of data abnormalities, provided with a data transmission line and a plurality of data transmission apparatuses connected in common to the data transmission line, wherein:

each data transmission apparatus generates transmission data to be output therefrom to the data transmission line, and is provided with a data abnormality monitoring means for detecting an abnormality in the data output to the transmission line, transmission data generated in each data transmission apparatus to be output therefrom to the data transmission line is wrapped around inside the respective data transmission apparatus to produce wrapped data, and the wrapped data inside each data transmission apparatus is input to the data abnormality monitoring means of the respective data transmission apparatus, the correlation of the wrapped data with the transmission data is monitored by the data abnormality monitoring means, and, when there is no correlation, it is determined that an abnormality has occurred in the transmission of data, so that each data transmission apparatus determines that an abnormality has occurred within the respective data transmission apparatus without relying on data from another data transmission apparatus.

2. A computer system having a facility for detection of data abnormalities as set forth in claim 1, wherein when data is transmitted under a frame synchronization system, a first bit pattern is assigned to the beginning of each said transmission data as a start flag and a second bit pattern is assigned to the end of each said transmission data as a stop flag, the first bit pattern and the second bit pattern being selected from an arbitrary arrangement of "1" and "0" bit series excluding an all "1" bit series and an all "0" bit series.

3. A computer system having a facility for detection of data abnormalities as set forth in claim 1, wherein said data abnormality monitoring means detects points of change of the input wrapped data and when the number of points of change detected is less than a predetermined reference value, it determines that there is no correlation and an abnormality has occurred in the transmission of data.

4. A computer system having a facility for detection of data abnormalities as set forth in claim 3, wherein said reference value is one value selected from among a plurality of predetermined reference values.

5. A computer system having a facility for detection of data abnormalities as set forth in claim 1, wherein said data abnormality monitoring means compares the transmission data output from the data transmission apparatus to the data transmission line and the wrapped data produced by wrapping in the data transmission apparatus and, when the two do not coincide, determines that there is no correlation and an abnormality has occurred in the transmission of data.

6. A computer system having a facility for detection of data abnormalities as set forth in claim 5, wherein the transmission data and the wrapped data are synchronized and the two are sequentially compared bit by bit.

7. A computer system having a facility for detection of data abnormalities as set forth in claim 1, wherein a switch means is provided in each data transmission apparatus at the connecting portion with the data transmission line, the switch means being opened to disconnect the data transmission apparatus and the data transmission line when the data abnormality monitoring means determines that there is no correlation.

8. A computer system having a facility for detection of data abnormalities as set forth in claim 7, wherein a wrap test of the transmission data is executed in the data transmission apparatus in the state with the switch means opened and the switch means being once again closed to connect with the data transmission line when no abnormality is detected in the data transmission as a result of the wrap test.

9. A computer system having a facility for detection of data abnormalities, provided with a data transmission line and a plurality of data transmission apparatuses connected in common to the data transmission line, wherein each data transmission apparatus is provided with:
- a central processing unit for transmission and reception of data with the data transmission line,
- a transmission/reception control unit connected with the central processing unit and controlling transmission and reception of the transmission data and received data,
- a driver for outputting the transmission data to the data transmission line,
- a receiver for receiving as input the data received from the data transmission line, and
- a data abnormality monitoring means for receiving as input the data received from the receiver, monitoring the correlation with the transmission data, and, when there is no correlation, determining that an abnormality has occurred in the transmission of the data, so that the data transmission apparatus determines that an abnormality has occurred without relying on data from another data transmission apparatus connected to the data transmission line.

10. A computer system having a facility for detection of data abnormalities as set forth in claim 9, wherein the data abnormality monitoring means is comprised of a changing point detecting unit which detects the points of change of the input received data, which means determines that an abnormality has occurred in the transmission of data when the number of points of change is less than a predetermined reference value.

11. A computer system having a facility for detection of data abnormalities as set forth in claim 10, wherein the data transmission apparatus comprises:
- a changing point frequency selector for detecting that the number of points of change is less than a predetermined reference value, and
- a changing point frequency latch for holding the results of detection by the change point frequency selector and for interrupting the central processing unit.

12. A computer system having a facility for detection of data abnormalities as set forth in claim 9, wherein the data abnormality monitoring means is comprised of a comparator which compares the input received data and the transmission data at the input side of the driver and determines that an abnormality has occurred in the transmission of data when the result of the comparison is that there is no coincidence.

13. A computer system having a facility for detection of data abnormalities as set forth in claim 12, wherein the transmission data and the received data are synchronized and a transmission data latch and received data latch are provided for temporarily holding the two at the input side of the comparator.

14. A computer system having a facility for detection of data abnormalities as set forth in claim 9, wherein the data transmission apparatus is further provided with a switch means inserted between the commonly connected driver output side and receiver input side and the data transmission line and a line disconnection control means for controlling the opening and closing the switch means, the switch means being opened through the line disconnection control means when it is determined by the data abnormality monitoring means that an abnormality has occurred in the transmission of data.

15. A computer system having a facility for detection of data abnormalities as set forth in claim 14, wherein a wrap test is executed in the data transmission apparatus by the central processing unit in the state with the switch means opened.

16. A computer system comprising:
- a data transmission line; and
- a plurality of data transmissions apparatuses connected in parallel to the data transmission line, each data transmission apparatus generating transmission data and providing the generated transmission data to the data transmission line, the generated transmission data provided to the data transmission line being wrapped around back to the respective data transmission apparatus without passing through any other data transmission apparatus, the wrapped generated transmission data being defined as wrapped data, each data transmission apparatus comprising:
  - a data abnormality monitoring unit which receives the generated transmission data and the wrapped data, and determines whether the generated transmission data correlates with the wrapped data, wherein it is determined that an abnormality occurred when the generated transmission data does not correlate with the wrapped data, so that the data transmission apparatus determines that an abnormality has occurred without relying on data from another data transmission apparatus.

17. A computer system as set forth in claim 16, wherein data is transmitted under a frame synchronization system and, for each data transmission apparatus of the plurality of data transmission apparatuses, a first bit pattern is assigned to the beginning of the generated transmission data as a start flag and a second bit pattern is assigned to the end of the generated transmission data as a stop flag, the first bit pattern and the second bit pattern being selected from an arbitrary arrangement of "1" and "0" bit series excluding an all "1" bit series and an all "0" bit series.

18. A computer system as forth in claim 16, wherein the data abnormality monitoring unit of each data transmission apparatus comprises:
- means for detecting points of change of the wrapped data, and
- means for comparing the detected points of change with a reference value, the data abnormality monitoring unit determining that the generated transmission data does not correlate with the wrapped data when the number of detected points is less than the reference value.

19. A computer system as set forth in claim 18, wherein the reference value is one value selected from among a plurality of reference values.

20. A computer system as set forth in claim 16, wherein, when the data abnormality monitoring unit of a respective data transmission apparatus determines that the generated transmission data does not correlate with the wrapped data, the data abnormality monitoring unit determines that an error occurred in the providing of the generated transmission data from the respective data transmission apparatus to the data transmission line.

21. A computer system as set forth in claim 20, wherein the transmission data and the wrapped data of each data transmission apparatus are synchronized and sequentially compared bit by bit by the data abnormality monitoring unit of the respective data transmission apparatus.

22. A computer system as set forth in claim 16, wherein each data transmission apparatus further comprises:
   a switch having a closed position to connect the data transmission apparatus to the data transmission line, and an open position to disconnect the data transmission apparatus from the data transmission line, and
   a means for opening the switch to disconnect the data transmission apparatus from the data transmission line when it is determined that an abnormality occurred.

23. A computer system as set forth in claim 22, wherein, in each data transmission apparatus, the data abnormality monitoring unit determines whether the generated transmission data correlates with the wrapped data with the switch of the respective data transmission apparatus being open and, when the generated transmission data correlates with the wrapped data, the switch is closed to connect the data transmission apparatus to the data transmission line, thereby preventing the generated transmission data from being provided to the data transmission line when an abnormality occurred.

24. A computer system as set forth in claim 16, wherein each data transmission apparatus further comprises:
   a receiver for receiving data from the data transmission line, the wrapped data being received by the receiver from the data transmission line, and the data abnormality monitoring unit receiving the wrapped data from the receiver.

25. A computer system as set forth in claim 24, wherein the data abnormality monitoring unit of each data transmission apparatus further comprises:
   a change point detecting unit for detecting points of change of the wrapped data, and for comparing the detected points of change with a reference value, the data abnormality monitoring unit determining that the generated transmission data does not correlate with the wrapped data when the number of detected points is less than the reference value.

26. A computer system as set forth in claim 25, wherein each data transmission apparatus includes a central processing unit for controlling the data transmission apparatus, and the data abnormality monitoring unit of each data transmission apparatus comprises:
   a changing point frequency selector for detecting that the number of points of change is less than a predetermined reference value, and
   a changing point frequency latch for holding the result of detection by the change point frequency selector and for interrupting the central processing unit when the result of detection indicates that an abnormality occurred.

27. A computer system as set forth in claim 24, wherein the data abnormality monitoring unit of each data transmission apparatus further comprises:

a comparator which receives the generated transmission data and the wrapped data and compares the received generated transmission data and the received wrapped data.

28. A computer system as set forth in claim 27, wherein the generated transmission data and the wrapped data are synchronized, and each data transmission apparatus further comprises:
   a transmission data latch for temporarily holding the generated transmission data before the generated transmission data is received by the comparator; and
   a received data latch for temporarily holding the wrapped data before the wrapped data is received by the comparator.

29. A computer system as set forth in claim 24, wherein each data transmission apparatus further comprises:
   a switch having a closed position to connect the data transmission apparatus to the data transmission line, and an open position to disconnect the data transmission apparatus from the data transmission line, and
   a means for opening the switch to disconnect the data transmission apparatus from the data transmission line when it is determined that an abnormality occurred.

30. A computer system as set forth in claim 29, wherein, in each data transmission apparatus, the data abnormality monitoring unit determines whether the generated transmission data correlates with the wrapped data with the switch of the respective data transmission apparatus being open, thereby preventing the generated transmission data from being provided to the data transmission line until it is determined whether an abnormality occurred.

31. A computer system comprising:
a data transmission line; and
a plurality of data transmission apparatuses connected to the data transmission line, each data transmission apparatus generating transmission data and providing the generated transmission data to the data transmission line, the generated transmission data provided to the data transmission line being wrapped around back to the respective data transmission apparatus without passing through any other data transmission apparatus, the wrapped generated transmission data being defined as wrapped data, each data transmission apparatus comprising:
   a data abnormality monitoring unit which receives the generated transmission data and the wrapped data, and determines whether the generated transmission data correlates with the wrapped data, wherein it is determined that an abnormality occurred when the generated transmission data does not correlate with the wrapped data, so that the data transmission apparatus determines that an abnormality has occurred without relying on data from another data transmission apparatus.

32. A data transmission apparatus connected to a data transmission line, the data transmission apparatus comprising:
   a data generating device which generates data and provides the generated data to the data transmission line, the generated data provided to the data transmission line being wrapped around back to the data transmission apparatus without passing through any other data transmission apparatuses connected to the data transmission line; and
   a data abnormality monitoring unit which receives the generated data and the wrapped generated data, determines whether the generated data correlates with the wrapped generated data, and determines that an abnormality has occurred in the data transmission apparatus when the generated data does not correlate with the wrapped generated data, so that the data transmission apparatus determines that an abnormality has occurred without relying on data from another data transmission apparatus connected to the data transmission line.

33. A communication system comprising:

a transmission line;

first and second processing devices connect to each other through the transmission line, wherein the first processing device includes:
- a data generating device which generates data for transmission to the second processing device and provides the generated data to the transmission line, the generated data provided to the transmission line being wrapped around back to the first processing device so that the wrapped generated data does not pass through the second processing device, and
- a data abnormality monitoring unit which receives the generated data and the wrapped generated data, determines whether the generated data correlates with the wrapped generated data, and determines that an abnormality has occurred in the first processing device when the generated data does not correlate with the wrapped generated data, so that the first processing device determines that an abnormality has occurred without relying on data produced by the second processing device.

34. A method for determining whether an abnormality occurs in data transmitted from a first processing device to a second processing device through a transmission line, the method comprising the steps of:
- generating data by the first processing device for transmission to the second processing device;
- providing the generated data to the transmission line;
- wrapping the generated data provided to the transmission line back to the first processing device so that the wrapped generated data does not pass through the second processing device;
- determining whether the generated data correlates with the wrapped generated data;
- determining that an abnormality has occurred in the first processing device when the generated data does not correlate with the wrapped generated data, to thereby determine whether an abnormality has occurred in the first processing device without relying on data produced by the second processing device.

35. A computer system having a facility for detection of data abnormalities, provided with a data transmission line and a plurality of data transmission apparatuses connected in common to the data transmission line, wherein each data transmission apparatus is provided with:
- a central processing unit for transmission and reception of data with the data transmission line,
- a transmission/reception control unit connected with the central processing unit and controlling transmission and reception of the transmission data and received data,
- a driver for outputting the transmission data to the data transmission line,
- a receiver for receiving as input the data received from the data transmission line, and
- a data abnormality monitoring means for receiving as input the data received from the receiver, monitoring the correlation with the transmission data, and, when there is no correlation, determining that an abnormality has occurred in the transmission of the data, wherein:
  the data abnormality monitoring means is comprised of
  a changing point detecting unit which detects the points of change of the input received data, which means determines that an abnormality has occurred in the transmission of data when the number of points of change is less than a predetermined reference value, and
  the data transmission apparatus comprises:
  a changing point frequency selector for detecting that the number of points of change is less than a predetermined reference value, and
  a changing point frequency latch for holding the results of detection by the change point frequency selector and for interrupting the central processing unit.

36. A computer system comprising:

a data transmission line; and a plurality of data transmissions apparatuses connected in parallel to the data transmission line, each data transmission apparatus generating transmission data and providing the generated transmission data to the data transmission line, the generated transmission data provided to the data transmission line being wrapped around back to the respective data transmission apparatus without passing through any other data transmission apparatus, the wrapped generated transmission data being defined as wrapped data, each data transmission apparatus comprising:

data abnormality monitoring means for receiving the generated transmission data and the wrapped data, and for determining whether the generated transmission data correlates with the wrapped data, wherein it is determined that an abnormality occurred when the generated transmission data does not correlate with the wrapped data, wherein:
each data transmission apparatus further comprises:
  a receiver for receiving data from the data transmission line, the wrapped data being received by the receiver from the data transmission line, and the data abnormality monitoring means receiving the wrapped data from the receiver,
the data abnormality monitoring means of each data transmission apparatus further comprises:
  a change point detecting unit for detecting points of change of the wrapped data, and for comparing the detected points of change with a reference value, the data abnormality monitoring means determining that the generated transmission data does not correlate with the wrapped data when the number of detected points is less than the reference value,
each data transmission apparatus includes a central processing unit for controlling the data transmission apparatus, and
the data abnormality monitoring means of each data transmission apparatus comprises:
  a changing point frequency selector for detecting that the number of points of change is less than a predetermined reference value, and
  a changing point frequency latch for holding the result of detection by the change point frequency selector and for interrupting the central processing unit when the result of detection indicates that an abnormality occurred.

37. A data transmission apparatus connected to a data transmission line, the data transmission apparatus comprising:
- a data generating device which generates data and provides the generated data to the data transmission line, the generated data provided to the data transmission line being wrapped around back to the data transmission apparatus without passing through any other data transmission apparatuses connected to the data transmission line;
- a data abnormality monitoring unit which receives the generated data and the wrapped generated data, determines whether the generated data correlates with the wrapped generated data, and determines that an abnormality has occurred in the data transmission apparatus when the generated data does not correlate with the wrapped generated data, so that the data transmission apparatus determines that an abnormality has occurred without relying on data from another data transmission apparatus connected to the data transmission line; and
- a switch which disconnects the data transmission apparatus from the data transmission line when the data abnormality monitoring unit determines that an abnormality has occurred.

38. A data transmission apparatus, connected to a data transmission line, comprising:
- a transmission control unit generating transmission data and transmitting the transmission data to the data transmission line, the transmission data being wrapped back to the data transmission apparatus without passing through any other data transmission apparatuses connected to the data transmission line;
- a data abnormality monitor detecting abnormalities in the wrapped transmission data without relying on data from another data transmission apparatus connected to the data transmission line; and
- a switch disconnecting the data transmission apparatus from the data transmission line when the data abnormality monitor detects an abnormality in the wrapped transmission data.

39. A data transmission apparatus as set forth in claim 38, wherein, after the switch disconnects the data transmission apparatus from the data transmission line, the data abnormality monitor checks for abnormalities in transmission data being generated by the data transmission apparatus after being disconnected, and the switch reconnects the data transmission apparatus to the data transmission line if the check by the data abnormality monitor indicates that there are no abnormalities.

40. A data transmission apparatus as set forth in claim 38, wherein the wrapped transmission data is wrapped by being wrapped back from the data transmission line.

* * * * *

UNITED STATES PATENT AND TRADEMARK OFFICE
CERTIFICATE OF CORRECTION

PATENT NO. : 6,023,774
DATED : February 8, 2000
INVENTOR(S) : Akitaka MINAGAWA

It is certified that error appears in the above-identified patent and that said Letters Patent is hereby corrected as shown below:

Col. 24, line 55, after "as" insert --set--.

Signed and Sealed this

Twenty-first Day of November, 2000

Attest:

Q. TODD DICKINSON

Attesting Officer     Director of Patents and Trademarks